US012801566B2

(12) United States Patent
Tekin et al.

(10) Patent No.: US 12,801,566 B2
(45) Date of Patent: Nov. 17, 2026

(54) TRANSFORMING TABLES IN DOCUMENTS INTO KNOWLEDGE GRAPHS USING NATURAL LANGUAGE PROCESSING

(71) Applicant: Oracle International Corporation, Redwood Shores, CA (US)

(72) Inventors: Doga Tekin, Zurich (CH); Francesco Ballestrazzi, Guiglia (IT)

(73) Assignee: Oracle International Corporation, Redwood Shores, CA (US)

( * ) Notice: Subject to any disclaimer, the term of this patent is extended or adjusted under 35 U.S.C. 154(b) by 636 days.

(21) Appl. No.: 18/226,502

(22) Filed: Jul. 26, 2023

(65) Prior Publication Data

US 2025/0036594 A1 Jan. 30, 2025

(51) Int. Cl.
*G06F 16/11* (2019.01)
*G06F 40/30* (2020.01)
(Continued)

(52) U.S. Cl.
CPC ............ *G06F 16/116* (2019.01); *G06F 40/30* (2020.01); *G06N 3/0455* (2023.01); *G06N 3/048* (2023.01); *G06N 3/084* (2013.01)

(58) Field of Classification Search
CPC ..... G06F 16/116; G06F 40/30; G06N 3/0455; G06N 3/048; G06N 3/084; G06N 3/044; G06N 3/045; G06N 3/08
See application file for complete search history.

(56) References Cited

U.S. PATENT DOCUMENTS 8,874,432 B2 * 10/2014 Qi ........................ G06F 16/3344 704/9
9,229,924 B2 * 1/2016 Sun ........................ G06F 40/242
(Continued)

OTHER PUBLICATIONS

Xu, Liyan et al., "Revealing the Myth of Higher-Order Inference in Coreference Resolution", Proceedings of the 2020 Conf on (EMNLP), Assoc. for Comptnl Linguistics, pp. 8527-8533, https://www.aclweb.org/anthology/2020.emnlp-main.686, Nov. 2020, 7pgs.
(Continued)

*Primary Examiner* — Michael Jared Walker
(74) *Attorney, Agent, or Firm* — Hickman Becker Bingham Ledesma LLP

(57) ABSTRACT

Herein from tabular data in a text document, a machine learning text classification pipeline infers natural language syntax and semantics to prepare the tabular data for graph analytics. In an embodiment, a computer infers a respective classification of each column in a table in a text document that contains natural language. Based on the classifications of the columns in the table, the vertices of the knowledge graph are automatically generated. Based on those column classifications and automatic analysis of a particular document portion that does not contain the table, the edges of the knowledge graph are automatically generated. The knowledge graph may be generated and operated as a property graph. Pipeline subsystems herein include column classification, edge type identification, and subject/object detection that provide sufficient semantic enrichment and context sensitivity to faster generate a more accurate knowledge graph than the state of the art.

16 Claims, 16 Drawing Sheets

(51) Int. Cl.

| | |
|---|---|
| ***G06N 3/0455*** | (2023.01) |
| ***G06N 3/048*** | (2023.01) |
| ***G06N 3/084*** | (2023.01) |

(56) References Cited

U.S. PATENT DOCUMENTS

| | | | | |
|---|---|---|---|---|
| 9,348,815 | B1 * | 5/2016 | Estes | G06F 40/40 |
| 9,495,398 | B2 | 11/2016 | Parkkinen | |
| 9,535,902 | B1 * | 1/2017 | Michalak | G06F 40/30 |
| 10,007,659 | B2 * | 6/2018 | Yamagami | G06F 40/30 |
| 10,380,259 | B2 * | 8/2019 | Lee | G06F 40/30 |
| 10,853,580 | B1 * | 12/2020 | Amrite | G06F 40/30 |
| 11,138,477 | B2 * | 10/2021 | Tandecki | G06F 18/24 |
| 11,393,141 | B1 * | 7/2022 | Hsu | G06F 16/288 |
| 11,487,941 | B2 * | 11/2022 | Ralhan | G06F 40/131 |
| 11,615,246 | B2 * | 3/2023 | Reisswig | G06F 16/355 704/9 |
| 12,051,255 | B1 * | 7/2024 | Sharma | G06F 18/241 |
| 2011/0270604 | A1 * | 11/2011 | Qi | G06F 40/30 704/9 |
| 2012/0253792 | A1 * | 10/2012 | Bespalov | G06F 16/353 704/9 |
| 2015/0213206 | A1 * | 7/2015 | Amarasingham | G16H 50/30 705/2 |
| 2018/0357220 | A1 * | 12/2018 | Galitsky | G06F 40/30 |
| 2019/0138595 | A1 * | 5/2019 | Galitsky | G06F 40/35 |
| 2019/0155941 | A1 * | 5/2019 | Bhide | G06N 5/046 |
| 2019/0236135 | A1 * | 8/2019 | Tyamagondlu Nagabhushan | G06F 40/30 |
| 2019/0272323 | A1 * | 9/2019 | Galitsky | G06F 40/253 |
| 2020/0117712 | A1 * | 4/2020 | Xu | G16H 30/40 |
| 2020/0142957 | A1 * | 5/2020 | Patra | G06N 3/0464 |
| 2021/0019312 | A1 * | 1/2021 | Shaik | G06F 16/24522 |
| 2021/0103810 | A1 * | 4/2021 | Subbaraya | G06N 3/048 |
| 2021/0295822 | A1 * | 9/2021 | Tomkins | G10L 15/197 |
| 2021/0342548 | A1 * | 11/2021 | Galitsky | G06F 40/35 |
| 2022/0121815 | A1 * | 4/2022 | Gruenewald | G06N 5/02 |
| 2022/0229983 | A1 * | 7/2022 | Zohrevand | G06N 5/01 |
| 2022/0253611 | A1 * | 8/2022 | Galitsky | G06N 3/09 |
| 2022/0353100 | A1 * | 11/2022 | Huang | G11B 27/031 |
| 2022/0391433 | A1 * | 12/2022 | Maheshwari | G06V 10/426 |
| 2022/0391583 | A1 * | 12/2022 | Ford, III | G06F 18/2148 |
| 2023/0016729 | A1 * | 1/2023 | Pouran Ben Veyseh | G06F 40/30 |
| 2023/0116515 | A1 * | 4/2023 | Kanagovi | G06F 40/295 704/9 |
| 2023/0132061 | A1 * | 4/2023 | Pfitzmann | G06F 40/295 706/45 |
| 2023/0206000 | A1 * | 6/2023 | Reisswig | G06N 3/04 704/9 |
| 2023/0237272 | A1 * | 7/2023 | Teixeira de Abreu Pinho | G06F 40/30 704/9 |
| 2023/0359649 | A1 * | 11/2023 | Wallack | G06F 16/285 |
| 2024/0061832 | A1 * | 2/2024 | Hoang | G06F 16/243 |
| 2024/0154941 | A1 * | 5/2024 | Nagpal | G06F 21/6254 |
| 2024/0330603 | A1 * | 10/2024 | Tu | G06F 40/47 |
| 2024/0403373 | A1 * | 12/2024 | Chao | G06F 16/9538 |

OTHER PUBLICATIONS

Velickovic et al., “Deep Graph Infomax”, ICLR 2019, 2018, 17 pages.

Vaswani, Ashish et al., “Attention Is All You Need”, Advances in neural info processing systems, https://doi.org/10.48550/arXiv.1706.03762, Dec. 6, 2017, 15pgs.

Stenetorp, Pontus, et al., “brat: a Web-based Tool for NLP-Assisted Text Annotation”, Proc. of the Demos at the 13th Conf of the EACL, Avignon, France: Association for Comp Linguistics, pp. 102-107, https://aclanthology.org/E12-2021, Apr. 2012, 6pgs.

SpaCy., “Industrial-strength Natural Language Processing in Python”, spacy.io, 2020, 9pgs.

Luan, Yi, et al., “Multi-Task Identification of Entities, Relations, and Coreference for Scientific Knowledge Graph Construction”, Proc. Conf. (EMNLP), https://doi.org/10.48550/arXiv.1808.09602, Aug. 29, 2018, 14pgs.

Lee, Kenton, et al., “Higher-Order Coreference Resolution with Coarse-to-Fine Inference”, Proceedings of NAACL-HLT 2018, vol. 2 (Short Papers). Association for Comptnl Linguistics, pp. 687-692, https://aclanthology.org/N18-2108, Jun. 2018, 6pgs.

Le et al., “Distributed representations of sentences and documents”, In Proceedings of the 31st International Conference on Machine Learning (ICML 2014), 2014, 9 pages.

Joshi, Mandar, et al., “SpanBERT: Improving Pre-training by Representing and Predicting Spans”, https://doi.org/10.48550/arXiv.1907.10529, Jul. 24, 2019, 12pgs.

Devlin, Jacob, et al., “BERT: Pre-training of Deep Bidirectional Transformers for Language Understanding”, https://doi.org/10.48550/arXiv.1810.04805, Oct. 11, 2018, 14pgs.

Prompting Large Language Model for Machine Translation—A Case Study, Biao et al., (Year: 2023).

Error Analysis Prompting Enables Human-Like Translation Evaluation in Large Language Models—A Case Study on ChatGPT, Qingyu Lu (Year: 2023).

Suhara et al., “Annotating Columns with Pre-trained Language Models” downloaded from https://arxiv.org/pdf/2104.01785.

* cited by examiner

COREFERENCE RESOLVER 420

TRANSFORMING TABLES IN DOCUMENTS INTO KNOWLEDGE GRAPHS USING NATURAL LANGUAGE PROCESSING

FIELD OF THE INVENTION

The present invention relates to natural language processing (NLP). Herein, a machine learning (ML) text classifier infers, from tabular data in a text document, natural language semantics to prepare the tabular data for graph analytics.

BACKGROUND

Reading and analyzing information in text documents written in natural language is a technical challenge. Business activity reports and news articles are rich with important information whose value can be increased with analytics. It may be useful to represent information in such documents as knowledge graphs for several reasons. A graph representation is easier to detect patterns by visual inspection. The graph representation allows further automatic processing using graph processing technologies, and allows the creation of a comprehensive graph that contains and links together information from several sources. Currently, this transformation from text documents to knowledge graphs is done by hand as a person must read the text (and any tables in the text) and construct nodes and edges from information they think is relevant. This is a time consuming process.

Especially problematic in natural language processing (NLP) is semantic analysis that depends on context and other correlations. A natural document may contain more than a sequence of paragraphs to be analyzed. The document may instead contain a mix of unstructured (i.e. natural), semi-structured, and structured parts. Document parts of discrepant kinds may be difficult to correlate, which may cause dependency analysis to be incomplete. Such analytic bottlenecks may cause a property graph to be less accurate.

DETAILED DESCRIPTION

Figure 1:
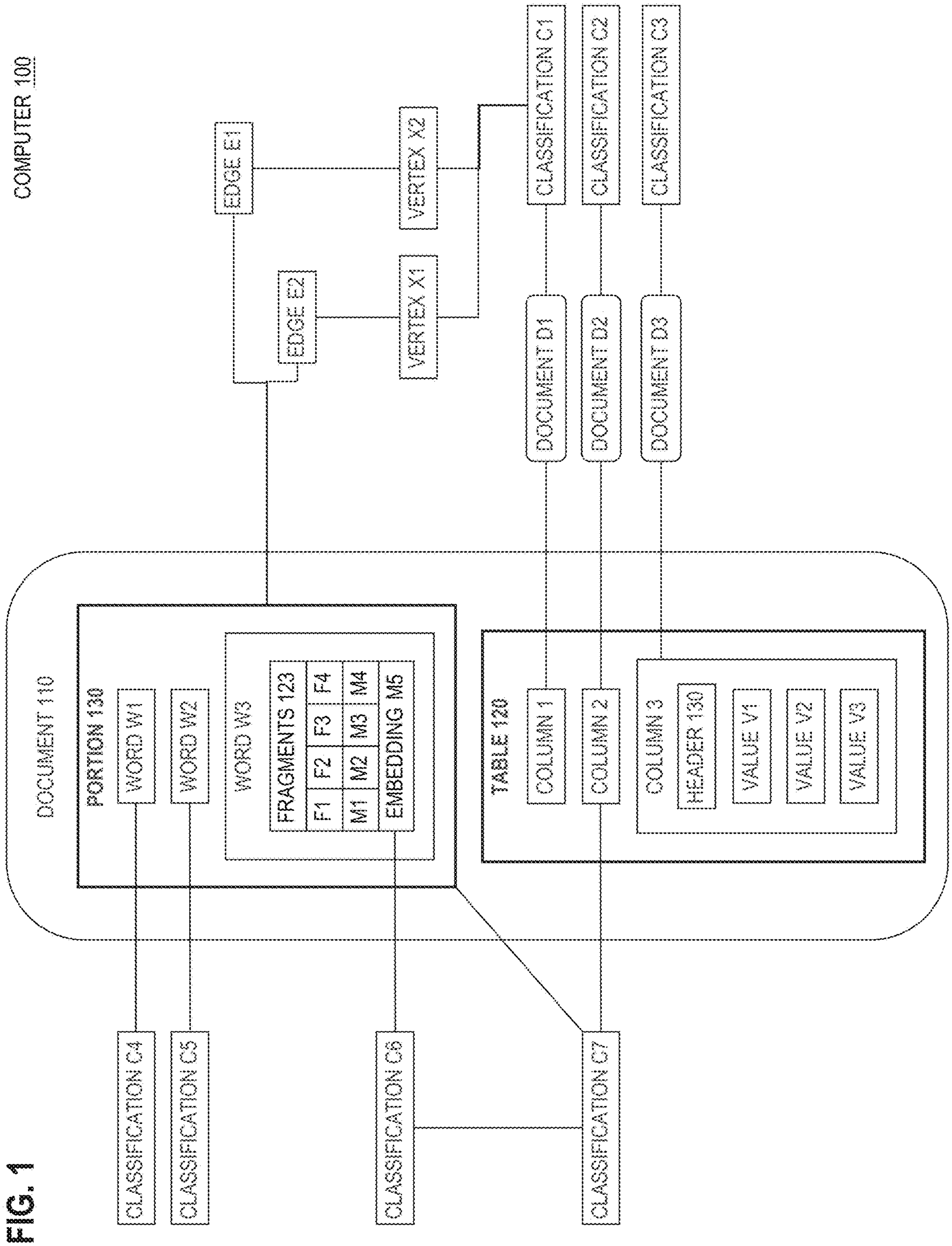
FIG. 1 is a block diagram that depicts an example computer that may discover natural language semantics for formatting contents from a data table in a text document for graph analytics.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present invention relates to natural language processing (NLP). Herein, a machine learning (ML) text classifier infers, from tabular data in a text document, natural language semantics to prepare the tabular data for graph analytics. Here is a new way to transform text documents into knowledge graphs by building a pipeline of state-of-the-art natural language processing techniques. The novel approach herein generates a knowledge graph from natural language documents that contain all the relevant information as tables and text, and this automation facilitates both easier visual inspection of the data and integrates with downstream processing for graph analytics using, for example, graph machine learning or pattern matching algorithms.

Techniques herein may be performed in an ML pipeline that streams or batches documents. Any tables that appear in a natural language document will have property graph components automatically generated. The ML pipeline may contain pretrained and fine-tunable NLP models that can be trained once on a set of text documents annotated with supervision labels. The NLP models learn to transform text documents and tables within documents into knowledge graphs. This ML pipeline may use and/or train a distinct NLP model for each of several subproblems addressed herein. As presented herein, various NLP models may be arranged in serial or parallel.

This approach creates a knowledge graph that represents the information in both the natural language text and the tables in a document. A text to graph pipeline may entail three steps:

- Named Entity Recognition (NER) to detect the relevant entities in the text which will be represented in the graph as nodes.
- Relation Extraction (RE) to detect the relations between the entities detected in NER which will be represented in the graph as edges.
- Coreference Resolution (CR) to consolidate different mentions of the same entity (including pronouns) in the text into a single vertex in the graph.

The named entity recognition and relation extraction models expect and act on inputs that are individual sentences, whereas the coreference resolution model works on the entire document. Increased accuracy and decreased or avoided training time are improvements herein that use pretrained NLP transformer models instead of LSTMs and ELMo embeddings that are not high performance.

To transform a table into a graph, information about entities in the table and their relations are automatically extracted based on learned inferences. In text documents for example, each row of a table may represent one transaction from one party to another. In a generated knowledge graph, each row is represented by a generated edge between two generated vertices. Learned inferences that facilitate creating this edge include the type of the edge, the subject and object of the directed edge, and other properties of the edge such as an amount or quantity and a date. Theses automatic inferences may be contextual due to dependencies between different parts of the document, or due to dependencies inside a particular part.

The inferences may guide automatic detections and decisions. For example, each row in a table may correspond to a distinct directed edge in a graph being generated. Each column in the table may correspond to either the subject, the object, or a property of the edges described in the table. Each table may provide a single edge type. For example, all rows in a table may be detected as purchase orders or those rows may all be detected as debits, etc.

Subsystems herein include column classification, edge type identification, and subject/object detection. The column classification model analyzes a table to determine whether each column is a subject, object, or a property. The edge type identification model uses context information to determine what type of edge occurs in the table. The subject/object detection model parses context information to determine the subject and/or object of the edges in the table, even when not expressly designated in the columns.

Techniques herein exceed the accuracy and speed of the state of the art. In an embodiment, a computer infers a respective classification of each column in a table in a text document that contains natural language. Based on the classifications of the columns in the table, the vertices of the knowledge graph are automatically generated. Based on those column classifications and automatic analysis of a particular document portion that does not contain the table, the edges of the knowledge graph are automatically generated. The knowledge graph may be generated and operated as a property graph.

1.0 Example Computer

FIG. 1 is a block diagram that depicts an example computer 100. In an embodiment, from table 120 in document 110, any of classifications C1-C7 by trained machine-learning (ML) inference may be used to discover natural language semantics for formatting contents of table 120 for graph analytics. Computer 100 may be one or more of a rack server such as a blade, a personal computer, a mainframe, or a virtual computer.

Computer 100 or another computer may perform graph analytics on any example graph presented later herein that represents semantic contents of a text document that contains natural language such as document 110 that may be stored in a file in a filesystem, in a database, or in volatile memory of computer 100. Document 110 may contain a mix of prose, such as portion 130, and tabular data such as table 120.

1.1 Example Knowledge Graph

NLP herein entails grammatic, syntactic, and semantic analysis of tables and portions of prose in document 110 to discover (i.e. dynamically detect) relations between entities, and computer 100 uses those entities and relations to respectively generate vertices and edges in a property graph, including vertices X1-X2 and edges E1-E2. A vertex may have few or many edges, but an edge has exactly two vertices (not shown). Due to syntax and semantics explained herein, linguistic classifications of entities include subjects and objects, which are linguistic roles that cause edges to be directed.

Computer 100 can use a natural language parser to generate interdependent pieces of a parse tree. Semantic analysis of the interdependent pieces facilitates generating a property graph that represents semantic content of a document that does not contain a table. However, the natural language parser cannot parse table 120 in document 110 because table 120 does not contain sentences, which the parser expects.

Table 120 contains rows (not shown) and columns 1-3. The intersection of one row and one column is a cell that contains exactly one value such as value V2. Values V1-V3 in column 3 occur in different respective rows. Each column may have its own format and semantics that are initially unknown to computer 100 that can discover such schematic details by various NLP techniques presented later herein. For example, computer 100 may discover that column 1 contains numbers of accounts that are objects, not subjects. In other words, computer 100 can infer syntax and semantics for tabular data, either from table 120 by itself, or from table 120 in conjunction with portion 130.

1.2 Column Classification

One goal of computer 100 is to infer linguistic classifications C1-C3 for respective columns 1-3 in table 120. Computer 100 may generate one vertex respectively for each value contained in columns based on the respective classifications of the columns as discussed later herein. For example if table 120 contains ten rows, then each of columns 1-3 contains ten values. In that case, computer 100 may generate, based on classification C1 of column 1, ten vertices including vertices X1-X2.

Another goal of computer 100 is to generate an edge for each row in table 120, where the edge is directed to connect exactly one vertex that represents a subject and exactly one vertex that instead represents an object. Edge generation is based on various NLP techniques for contents of portion 130 and based on inferred classifications of column(s). For example if classification C1 indicates that column 1 contains numbers of accounts that are objects, not subjects, then vertices X1-X2 represent objects, not subjects.

Because edges E1-E2 should additionally be connected to respective subject vertices (not shown), other column 2 or 3 may provide values for generating subject vertices. For example, classification C2 may indicate that values in column 2 represent subjects. Computer 100 also accommodates scenarios where table 120 has only one column or where only one column is reliably classified. For example, any of classifications C1-C3 that does not exceed a confidence threshold is rejected as inconclusive and is not used for column interpretation. Thus, computer 100 may sometimes discover only a subject or an object column in table 120 but not both. In such cases, edges E1-E2 cannot be generated based solely on table 120, and are instead generated based additionally on syntax and semantics of portion 130 that accompanies table 120.

Instead of being contained in table 120, portion 130 may be adjacent to table 120 in document 110. For example, portion 130 is prose that may be a variable-sized (i.e. word count) sentence or paragraph that may be directly above (i.e. immediately precedes) table 120. Likewise, portion 130 may be a variable-sized caption directly below (i.e. immediately follows) table 120. In another example, portion 130 contains a fixed count of words that occur immediately before or after table 120 or both before and after. Document 110 may contain prose that portion 130 does not contain, such as in other portions.

As discussed later herein, classification C7 may be inferred for portion 130 of prose, and classification C7 may be comparable to classifications C1-C3. In an example not shown, table 120 has only columns 1-2 but not column 3. If classification C1 indicates that column 1 is an object, not a subject, and classification C2 is inconclusive as discussed above, then a classification for column 2 may be imputed from portion 130. For example, classification C7 of portion 130 may be used as the classification of column 2 instead of inconclusive (e.g. missing) classification C2.

In other words, portion 130 of prose may provide sufficient linguistic context to supply a missing classification of: a) a column in table 120 and/or b) a missing and complementary vertex type as a prerequisite for determining an edge type. For example for (b), a table that has only one column cannot supply both a subject and an object as needed to determine a directed edge type. The missing subject or object may be supplied by portion 130 based on classification C7, even if classification C7 has no corresponding column in table 120. In an example not shown, table 120 has only column 1 but not columns 2-3. If classification C1 indicates that column 1 contains account numbers as an object, not a subject, then vertices X1-X2 may represent different accounts. In that case, classification C7 may indicate that the subject should be extracted from portion 130 instead of table 120.

For example, one identified company may be extracted from portion 130 of prose, and that one company may be used as a subject to complement object vertices X1-X2 as needed to generate edges E1-E2. For example, edges E1-E2 may both connect to a same subject vertex that represents that company. Thus, a generated graph may indicate that a single company has deposited money into multiple accounts, which is a graph topology that can be generated from document 110 only by inferring classification(s) for table 120, which is novel, with or without classification(s) for portion 130. Classifications C4-C6 are discussed later herein.

2.0 First Example Natural Language Processing (NLP) Pipeline

Figure 2A:
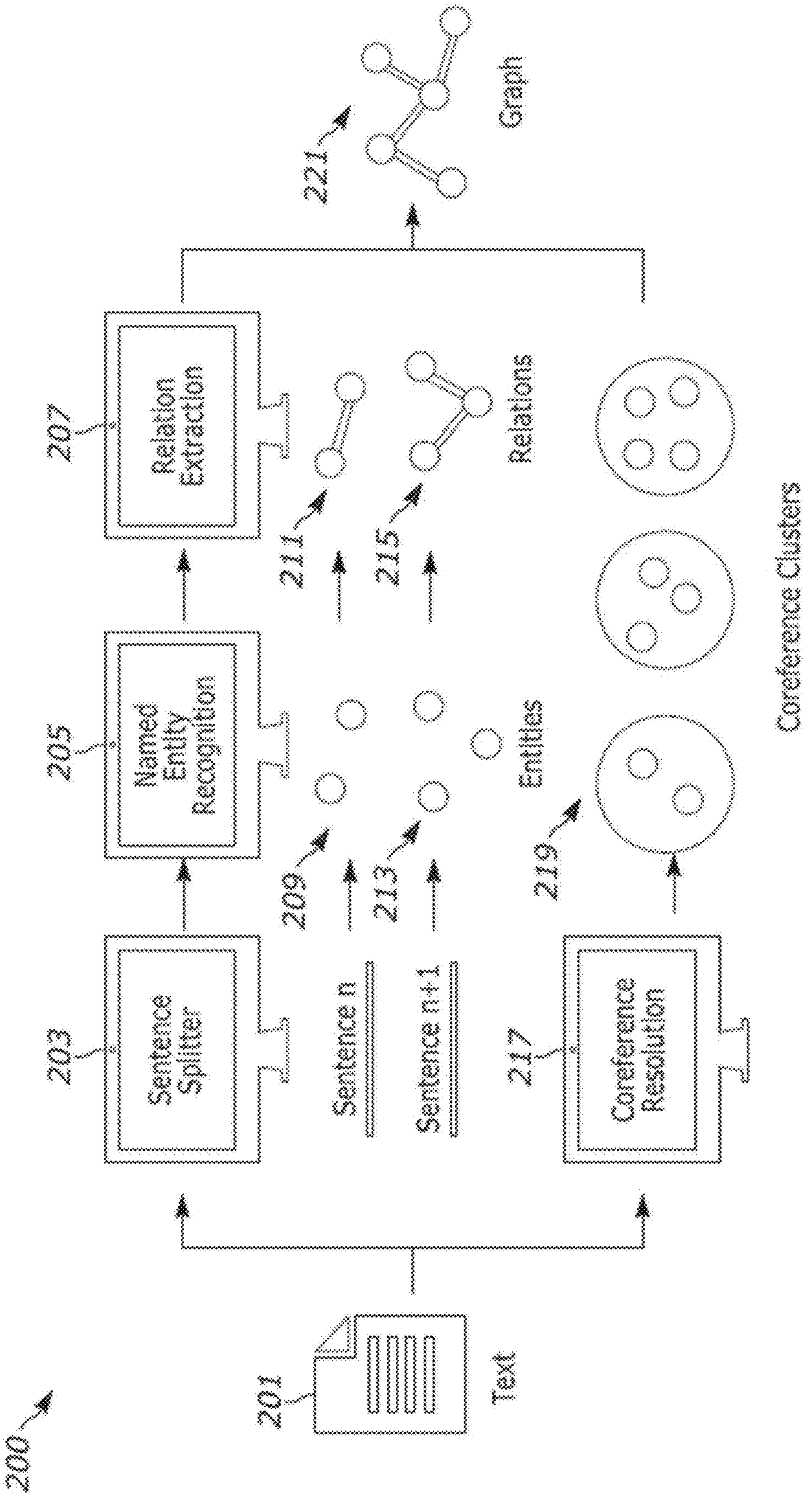
FIG. 2A is a dataflow diagram that depicts an example natural language processing (NLP) pipeline that has NLP stages connected in series and in parallel.

FIG. 2A is a dataflow diagram that depicts an example natural language processing (NLP) pipeline 200 that has NLP stages connected in series and in parallel. One or more of computer 100 may implement any or all of the NLP stages of NLP pipeline 200. FIG. 2A is discussed with reference to FIG. 1.

FIG. 2A is demonstratively provided as a high level overview of an NLP pipeline that is enhanced to generate graph 221 that represents text document 201. FIG. 2A incorporates the mechanisms, stages, and novel specialized NLP pipelines presented later herein.

In FIG. 2A, data flows from left to right according to the unnumbered shown arrows. Text document 201 enters NLP pipeline 200 that consists primarily of two (i.e. top and bottom) parallel internal pipelines that, like NLP pipeline 200, have horizontal dataflow from left to right. Upon entering NLP pipeline 200, text document 201 is (e.g. concurrently) processed by both of top and bottom internal pipelines.

The top internal pipeline has a sequence of NLP stages 203, 205, and 207, and these may or may not be implemented as separate NLP pipelines. The top internal pipeline logically decomposes text document 201 into natural language sentences. Sentences may be terminated by occurrences of a small predefined set of sentence termination characters such as period, question mark, exclamation point, and semicolon. Each sentence is individually processed by NLP stages 203, 205, and 207. For example, shown sentence n+1 is preceded by shown sentence n. In an embodiment, multiple sentences are concurrently processed by each individual one of NLP stages 203, 205, and 207. For example, sentence splitter 203 may concurrently process both of sentences n and n+1. Any discussion herein of one current sentence is as a demonstrative convenience that does not prevent concurrent processing of multiple (e.g. all) sentences.

Sentence splitter 203 tokenizes the current sentence by decomposing the current sentence into occurrences of individual words. Sentence splitter 203 may detect whitespace characters in the current sentence as separators between words. For example, "It starts fast and ends fast." is an example sentence that has multiple occurrences of same word "fast" in different positions within the sequence of word occurrences in the example sentence. Sentence splitter 203 may generate an encoding of the current sentence as a feature vector in which each feature has a one-to-one correspondence to each word occurrence. Thus, each position in the feature vector corresponds to each position in the sequence of word occurrences in the example sentence. Encoding example embeddings of each word occurrence into the feature vector is discussed later herein.

In an embodiment, sentence splitter 203 performs statistical dependency parsing using a library such as open source spaCy whose parser finds the linguistic dependencies of all noun chunks (e.g. subwords), adjectives, and verbs in prose to infer sentence boundaries even when punctuation marks do not provide clear separation of sentences.

Sentence splitter 203 emits the generated feature vector as output, which named entity recognition 205 accepts as input. Named entity recognition 205 detects names of entities, and an entity name may consist of a sequence of one or more words such as "Joe Lunchbox" that may be an entity that represents a person. An entity is a distinct person, place, or thing, and has a name that is distinct within text document 201. In this example, named entities 209 are recognized in sentence n, and named entities 213 are recognized in sentence n+1.

Named entity recognition 205 may replace each occurrence of the word(s) of an entity name with a token (i.e. identifier or learned embedding) that uniquely represents the named entity. Named entity recognition 205 generates a feature vector, somewhat similar to that generated by sentence splitter 203, except that some word(s) are replaced by fewer tokens of recognized entities. The tokens are fewer because multiple words may be replaced by a single (e.g.

learned) token that represents those words. Thus, the output of named entity recognition 205 may be smaller and denser and semantically richer than the less refined output of sentence splitter 203. Entity detection is a form of semantic (i.e. not syntactic) analysis, and named entity recognition 205 provides a semantically enriched representation of the current sentence as an output vector that relation extraction 207 accepts as input. Named entity recognition 205 has other embodiments, including later herein named entity recognizer 230 that has a special way to recognize and classify an entity as a short sequence of adjacent words.

Relation extraction 207 combines (e.g. learned) syntactic and semantic analysis to detect relations between entities and objects or other entities. Relation extraction 207 may classify words by syntactic role such as noun and verb or even subject and object or base and modifier (e.g. adjective or adverb). Extracted relations 211 and 215 may or may not directly correspond to syntactic dependencies such as respective pieces of a parse tree. Relations 215 may be inferred without generating a whole parse tree.

Because relations are composable, NLP pipeline 200 interconnects extracted relations 211 and 215, emitted as output by relation extraction 207, to become a cohesive compound data structure shown as graph 221 that represents the contents of text document 201 and is subsequently suitable for automated graph analytics.

The bottom internal pipeline has only one NLP stage, which is coreference resolution 217 that performs (e.g. learned) semantic analysis to detect entity aliases that are alternate names or other words that denote a same entity in different ways. This semantic analysis may detect an antecedent of a pronoun, which may be a highly contextual detection. For example, which entity is the pronoun "it" a coreference (i.e. alias) of may depend on which sentence or phrase contains the current instance of "it". That is, two instances of "it" (e.g. in two separate sentences) may have different respective antecedents (e.g. nouns) that resolve to different respective entities.

Coreference clusters 219 are shown as three large circles containing different amounts of small circles. Each large circle represents a cluster that represents a respective entity. Each small circle within a cluster represents a distinct coreference (i.e. alias) of the same entity. Different sentences may have coreferences in a same cluster (for a same entity). For example, "The bicycle is red. It is new, and it is a fast bike!" are example sentences that may contribute four (i.e. "bicycle", "it", "it", "bike") coreferences to one cluster.

Before final generation of graph 221, NLP pipeline 200 uses generated coreference clusters 219 to disambiguate words that may otherwise represent an unknown entity or multiple mutually-exclusive possible entities. For example, each coreference in a cluster may be treated as a placeholder that may be replaced in any relation by a token (i.e. identifier or learned embedding) that uniquely represents the entity that the cluster represents. Coreference clusters 219 may be used to process relations 211 and 215 that consist of a few connected vertices as shown.

For a coreference and entity in a same cluster, replacement of the coreference in a first relation with the entity from a second relation may cause the vertex that represents the coreference to be merged with the vertex that represents the entity. That merging of two vertices from different (i.e. unconnected) relations may cause both relations to become connected at the merged vertex that represents the entity. In that way, relations may be composable to combine all of relations 211 and 215 to generate topologically complex graph 221 that may contain many relations, such as linear chains of relations, branches off of a chain, and a star having several branches.

2.1 Example Named Entity Recognizer

Figure 2B:
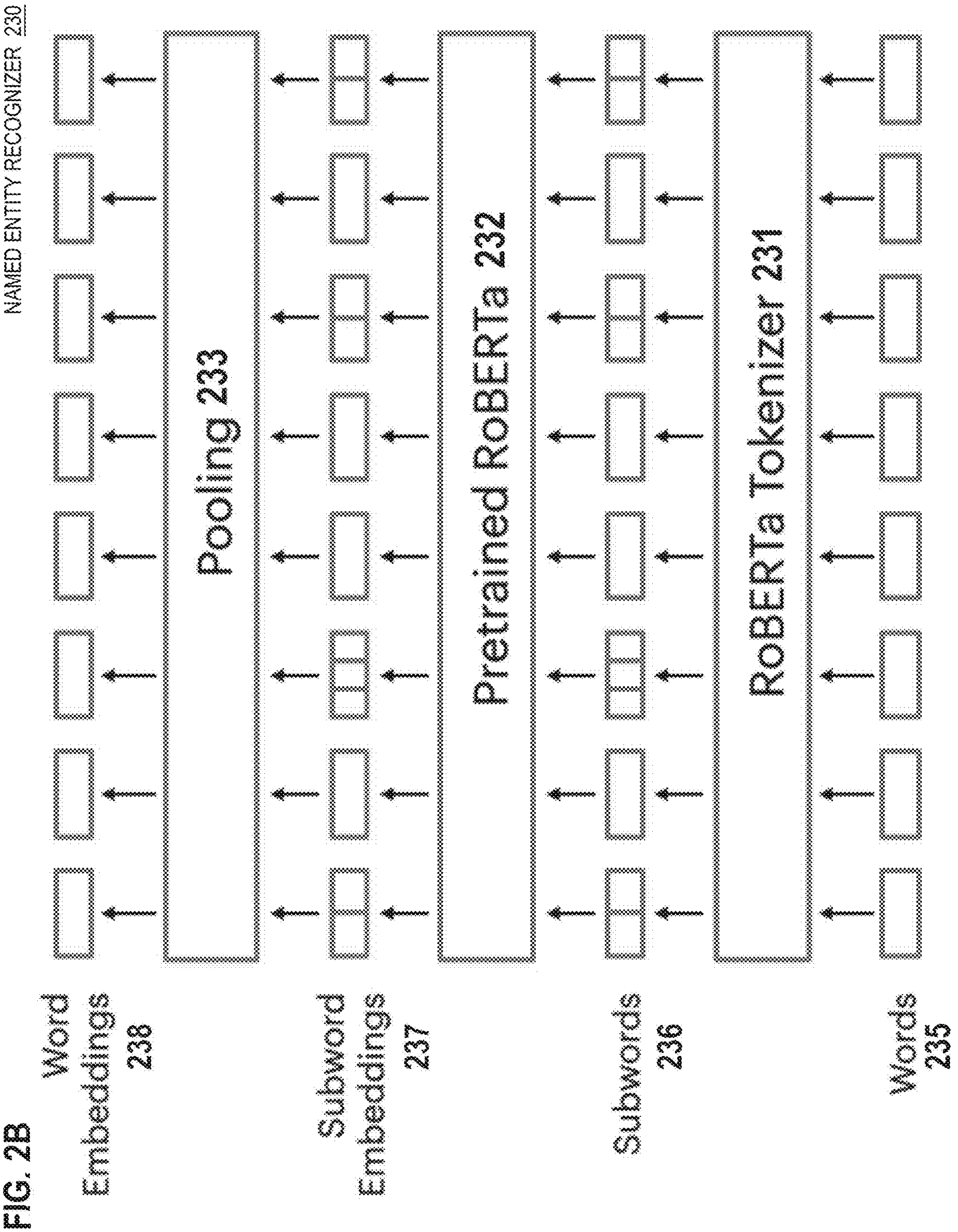
FIG. 2B is a dataflow diagram that depicts an example named entity recognizer.

FIG. 2B is a dataflow diagram that depicts an example named entity recognizer 230 that may be an implementation of named entity recognition 205 of FIG. 2A. FIG. 2B is discussed with reference to FIGS. 1 and 2A.

Words 235 may be the sequence of natural language words in sentence n of FIG. 2A. Named entity recognizer 230: a) accepts words 235 as input or b) accepts sentence n as input and extracts words 235 from sentence n.

Named entity recognizer 230 is an artificial neural network (ANN) that contains a sequence of three neural tiers 231-232, and each neural tier may contain its own sequence of neural layers. Flowing data 235-238 flow into and/or out of a neural tier, and each neural tier may or may not be implemented as a separate neural network. As shown, subwords 236 are generated as output by roberta tokenizer 231 and accepted as input by pretrained roberta 232. Each of flowing data 235-238 is a sequence. For example, words 235 is a sequence of words.

Roberta tokenizer 231 is pretrained to accept words 235 as input and infer subwords 236 as output. For example, the leftmost word of words 235 is split into two subwords in inferred subwords 236 as shown. One of words 235 splits into three subwords as shown. As shown, some words are not split into subwords. For example, nonsense may contain "non" as a subword. A subword may have natural language semantics. Herein, a subword is also referred to as a word fragment.

By factorization, subwords decrease the count of words in a vocabulary (i.e. dictionary). For example, detecting "s" as a subword means that singular and plural forms of a word may share a base subword. In that case, "cat", "cats", "dog", "dogs", "whale", "whales" are six words that can be refactored into a vocabulary of only four subwords "cat", "dog", "whale", and "s".

Pretrained roberta 232 may implement bidirectional encoder representations from transformers (BERT). A transformer implements neural self-attention to focus on different parts of subwords 236 as an input sequence (e.g. sentence). This sequence processing captures long-range dependencies between subwords 236.

Pretrained roberta 232 accepts subwords 236 as input and infers learned subword embeddings 237 as output. Subword embeddings are contextual. For example, "less" is a subword whose embedding is different depending on which word contains "less", such as touchless and reckless.

Each embedding in subword embeddings 237 may have a different amount of subwords. Thus, subword embeddings 237 contains variable-sized embeddings.

Pooling is a technique used to summarize a variable-sized sequence (i.e. one embedding of subword embeddings 237) into a fixed-length vector (i.e. one embedding of word embeddings 238). Pooling 233 accepts subword embeddings 237 as input and infers learned word embeddings as output. A natural language word is represented by a word embedding that is based on the embeddings of the constituent subwords of the word, but is not contextual. For example, the shown leftmost of subword embeddings 237 is a pair of two subwords that represent a word. The relative ordering of those two subwords does not affect the inferred word embedding of that word. Pooling 233 may perform mean pooling (i.e. numeric averaging) of both subwords to infer a word embedding in word embeddings 238. Mean pooling ignores the relative ordering of subwords within a word.

2.2 Named Entity Recognizer Training

Figure 2C:
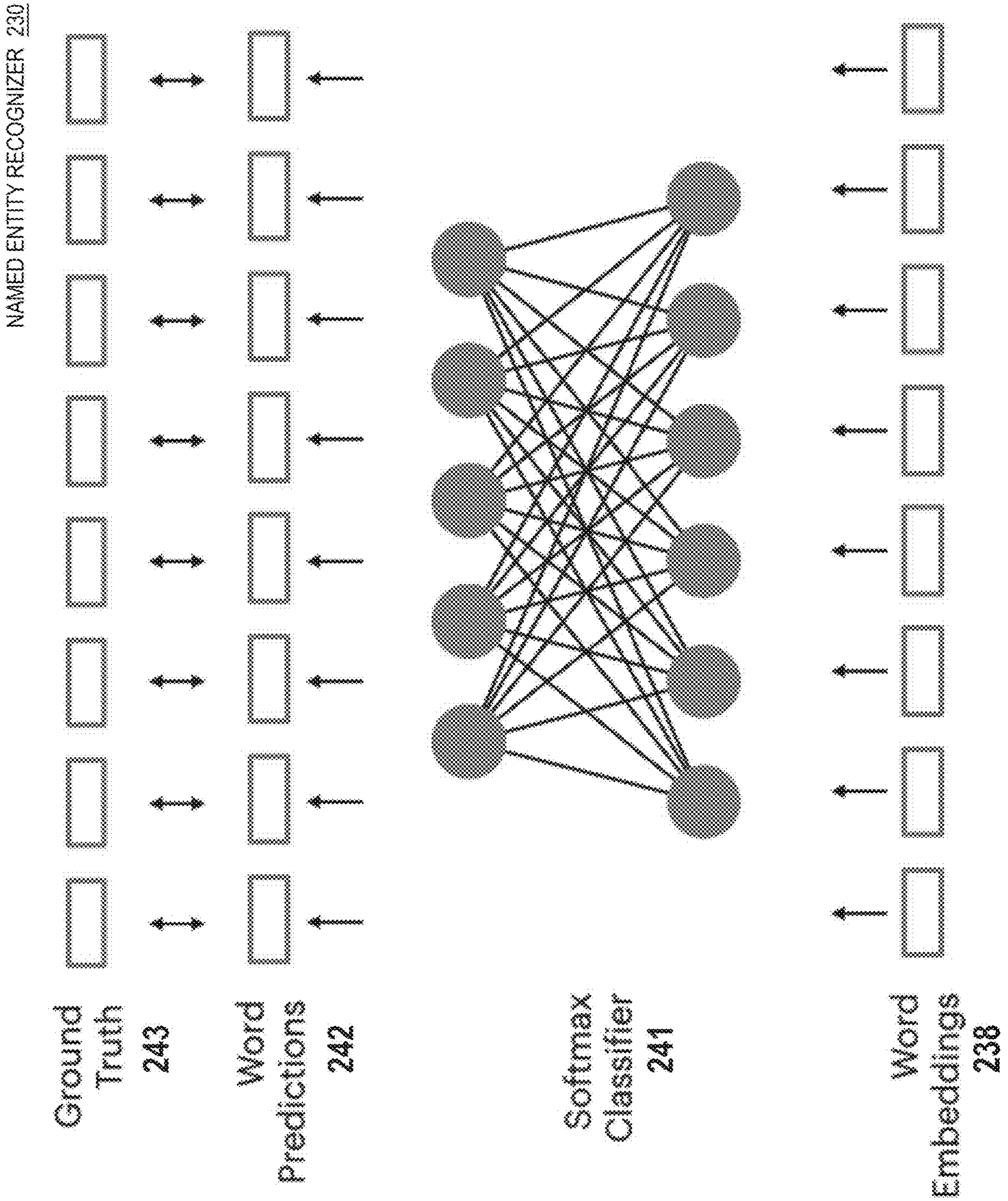
FIG. 2C is a dataflow diagram that depicts example training of a named entity recognizer.

FIG. 2C is a dataflow diagram that depicts example training of named entity recognizer 230 of FIG. 2B. FIG. 2C is discussed with reference to FIG. 2B.

As explained for FIG. 2B, pooling 233 generates word embeddings 238. Softmax classifier 241 accepts word embeddings 238 as input and individually processes each word embedding. Each word embedding passes through softmax classifier 241 that may be a single linear layer feed-forward neural network or a two-layer feed-forward neural network to predict probabilities for that word belonging to each class. Some example classes may include person, organization, and location. In an embodiment, softmax classifier 241 does not directly predict an entity type for each word, and softmax classifier 241 instead predicts an entity type for a sequence of a few adjacent words and indicates where one entity ends and another starts, especially if two entities of a same type are adjacent.

Ground truth 243 is a one-hot label encoding, where the one represents the correct class. Cross-entropy loss is used between word predictions 242 and ground truth 243 and backpropagated to fine-tune softmax classifier 241 and weights in pretrained roberta 232. During training, the cross-entropy loss propagates back through all components in the reverse direction of the arrows, fine-tuning every neural tier shown in FIGS. 2B-C. Word predictions 242 are the inferred class, which has the highest inferred probability for a word.

2.3 Example Relation Extractor

Figure 2D:
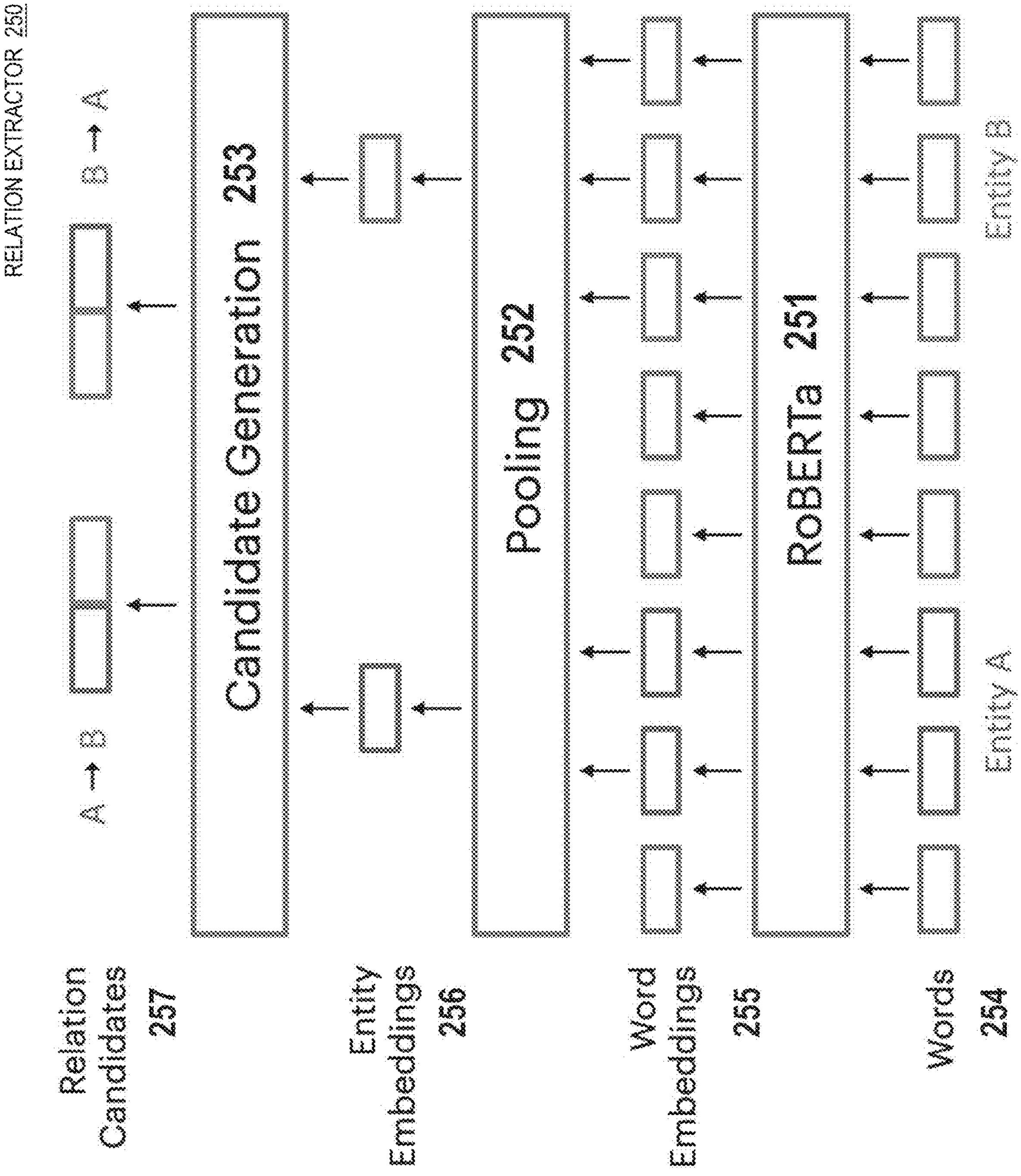
FIG. 2D is a dataflow diagram that depicts an example relation extractor.

FIG. 2D is a dataflow diagram that depicts an example relation extractor 250 that may be an implementation of relation extraction 207 of FIG. 2A. FIG. 2D is discussed with reference to FIG. 2B.

Although relation extractor 250 and named entity recognizer 230 are different subsystems, their internal architectures and dataflows may have some similarities. Words 254 operate similar to words 235 as discussed earlier herein. Although not shown in FIG. 2D, relation extractor 250 contains components similar to roberta tokenizer 231 and subwords 236.

Roberta 251 operates similar to pretrained roberta 232 as discussed earlier herein. Relation extractor 250 contains pooling 252 that is downstream of an unshown pooling that operates similar to pooling 233. From roberta 251, the unshown pooling accepts subword embeddings that operate similar to subword embeddings 237. The unshown pooling emits word embeddings 233 that operate similar to word embeddings 238.

Pooling 252 generates one embedding of entity embeddings 256 for each entity. If an entity consists of a single word, the entity embedding is the same as the embedding of that word. If the entity consists of multiple words, then pooling 252 mean-pools (i.e. averages) the embeddings of each word in the entity to obtain the entity embedding.

Candidate generation 253 generates relation candidates 257 by pairing entities because each relation has two entities. Each pair of entities in a sentence is considered as a candidate to have two oppositely-directed relations. With n entities, there are $n \cdot (n-1)$ candidate relations in total. These relation candidates are represented by the concatenation of the entity embeddings of the pair. The directionality is represented by the order of concatenation. When representing the relation A→B, the embeddings of A and B are concatenated in the order A before B. When instead representing the relation B→A, the embeddings of A and B are concatenated in the order B before A.

2.4 Relation Extractor Training

Figure 2E:
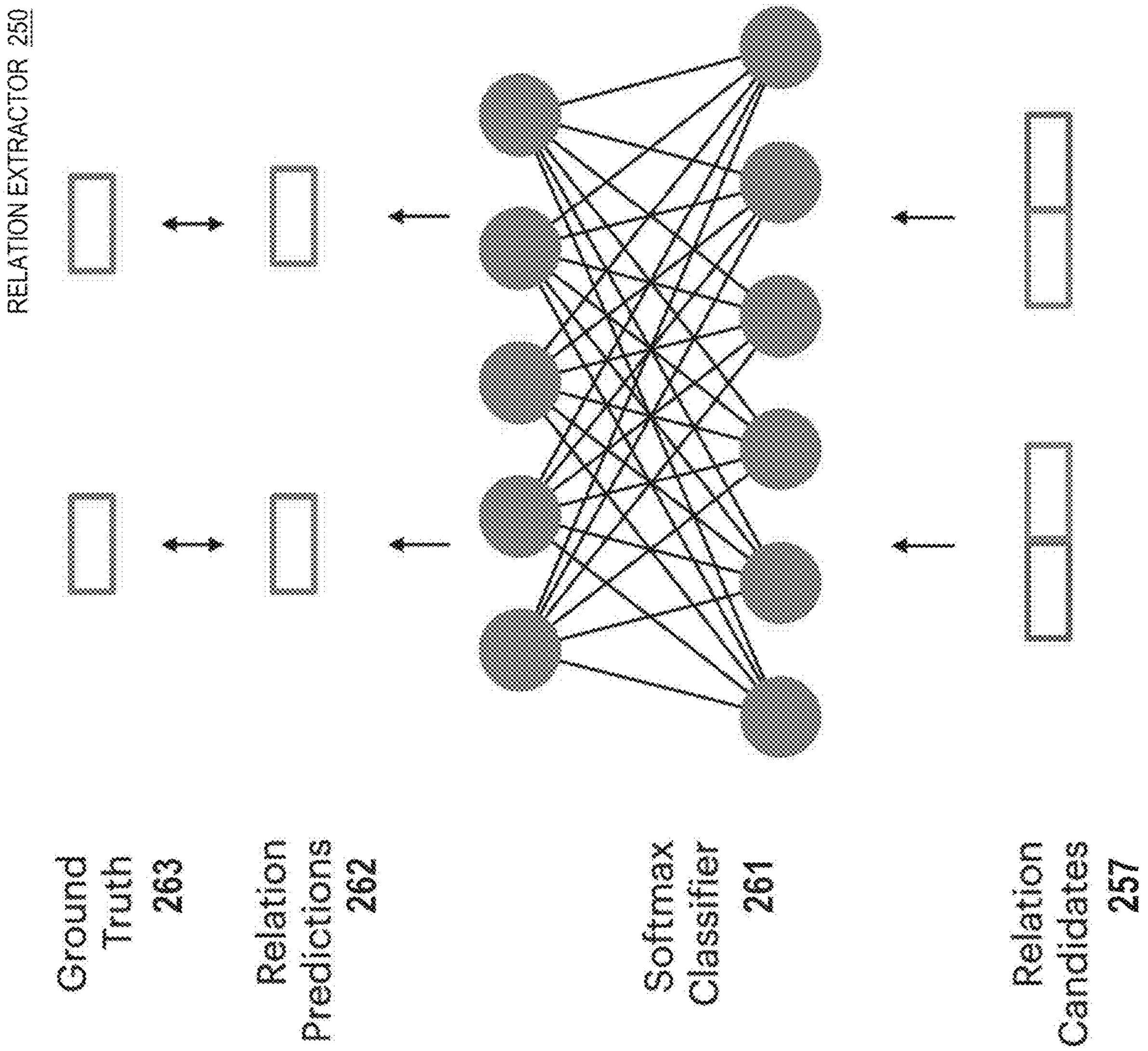
FIG. 2E is a dataflow diagram that depicts example training of a relation extractor.

FIG. 2E is a dataflow diagram that depicts example training of relation extractor 250. FIG. 2E is discussed with reference to FIGS. 2C-D.

Relation candidates 257 are passed through softmax classifier 261 that operates similar to softmax classifier 241. The classifier outputs relations predictions 262 for each relation candidate, including the predicted probability of the candidate relation belonging to any of the possible relation types, including the probability of "no relation" between the entities, which means no relation in that direction, although the prediction in the opposite direction might differ.

Ground truth 263 is one-hot encoded as discussed earlier for ground truth 243. Backpropagation of cross-entropy loss for fine tuning occurs similar to as discussed earlier for FIG. 2C. Example relation types (i.e. classes) include ownership, transaction, visit, counterparty, and acquaintance. Some relation types may be more specific such as financial transaction, cash transaction, or electronic transaction.

3.0 Table2Graph

Figure 3:
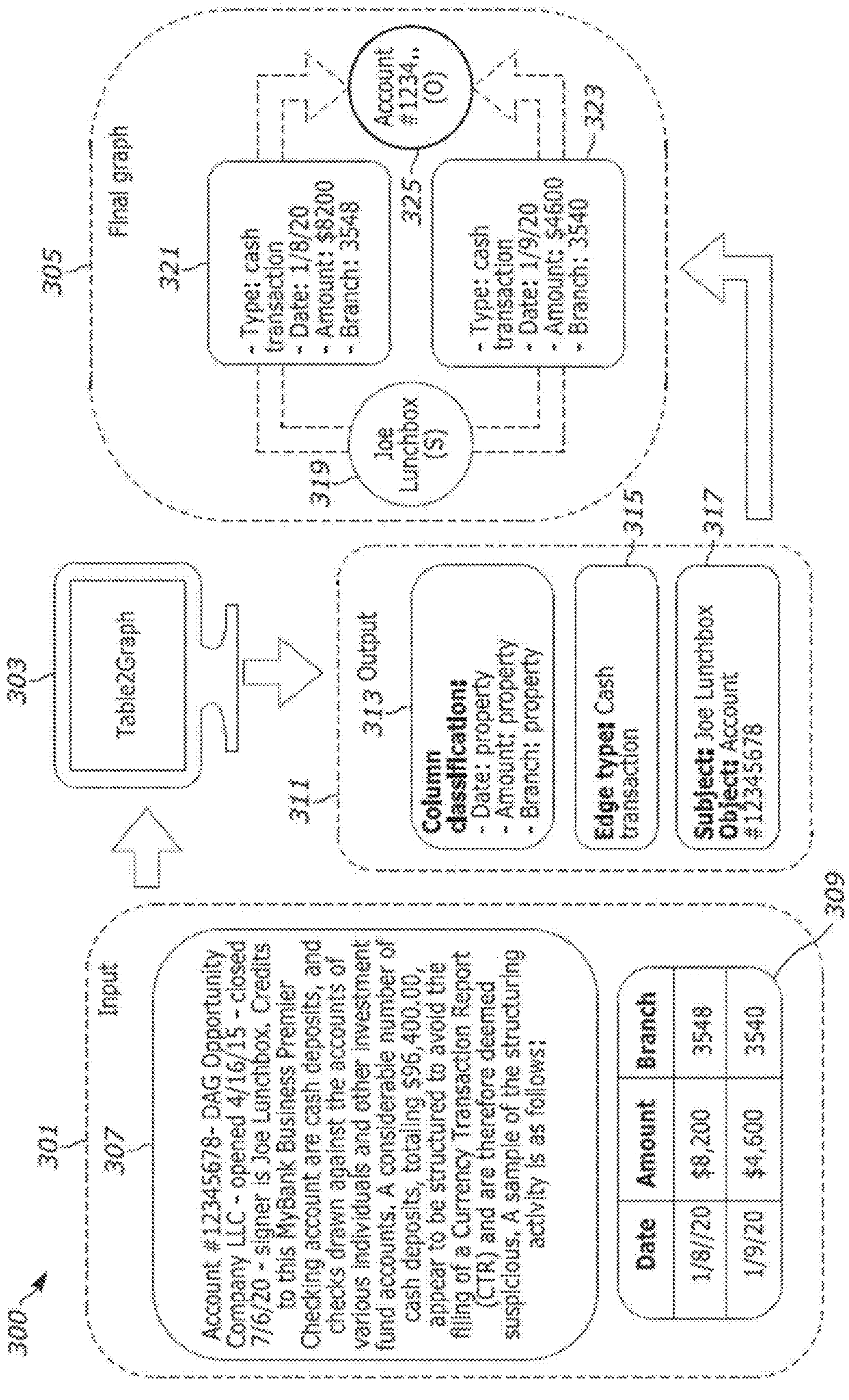
FIG. 3 is a dataflow diagram that depicts example table2graph that has NLP stage(s) that analyzes a data table in a text document to generate corresponding graph elements in a property graph.

FIG. 3 is a dataflow diagram that depicts an example natural language processing (NLP) pipeline 300 that has table2graph 303 that is an NLP stage or pipeline that analyzes table 309 in text document 301 to generate corresponding graph elements 319, 321, 323, and 325 in property graph 305. One or more of computer 100 may implement any or all of the NLP stages of NLP pipeline 300. NLP pipelines 200 and 300 are compatible and their NLP stages may be combined or interleaved in a same NLP pipeline. FIG. 3 is discussed with reference to FIG. 1.

NLP pipeline 300 accepts text document 301 as input. Table2graph 303 is an NLP stage that may be arranged in serial or in parallel with other stages (not shown) in NLP pipeline 300. Either NLP pipeline 300 or table2graph 303 logically decomposes text document 301 into the following sequence of four parts: a) prose and/or tables that precede portion 307 of prose in text document 301, b) portion 307 that is a small (e.g. sentence or paragraph as discussed later herein) amount of natural language prose that immediately precedes table 309, c) table 309, and d) prose and/or tables that follow table 309 in text document 301. In some examples, the ordering of (b)-(c) is reversed. That is, portion 307 of prose may immediately precede or immediately follow table 309.

Table2graph 303 accepts portion 307 of prose and table 309 as input. Table 309 contains three columns and three rows as shown. The top row of table 309 is a header that indicates the respective name of each column. Each of the remaining rows are individually analyzed by relation extractor 250 of FIG. 2C in table2graph 303 to generate a respective one of edges 321 and 323 that both connect vertices 319 and 325 in graph 305. For example, relation predictions 262 of FIG. 2E may be used to generate edges 321 and 323.

Table2graph 303 analyzes portion 307 of prose and table 309 to generate inferences 311 as output that NLP pipeline 300 uses to generate graph 305. Inferences 311 contains inferences 313, 315, and 317, all of which are trainable.

Column classifications 313 contains one linguistic classification inference per column of table 309. A predefined small set of linguistic classes may contain an entity class and, for attributes of entities, a property class. For example as shown in column classifications 313, all three columns of table 309 are classified by table2graph 303 as properties, not entities. Learned column classifying may be based on the name and/or content datatype of a column.

Edge type detection 315 is a single inference that detects the edge type that is shared by edges 321 and 323 that are generated from table 309. In some cases, edge type detection 315 can be inferred solely from column classifications 313. In other cases, edge type detection 315 is also based on portion 307 of prose. As discussed later herein, edge type detection is a form of learned classification of: table 309, a column in table 309, and/or portion 307 of prose. In the shown example, edge type detection 315 is based on portion 307 of prose that says "cash deposits . . . cash deposits . . . Currency Transaction" that may cause NLP by table2graph 303 to infer that edge type detection 315 is cash transaction. Thus, edge type detection 315 is an inference that edges 321 and 323 should represent cash transactions.

A relation, as discussed earlier herein, may connect two entities and be represented as an edge that connects two vertices. Herein, edges are directed, which means that both entities of a relation have respective linguistic roles such as subject and object. Subject and object 317 are an inferred subject and an inferred object, which are two separate linguistic inferences that are role classifications. Document elements 307 and 309 may contain many entities that table2graph 303 may infer respective roles for. Of those many entities, several may be classified as a subject, but only one of those subjects is inferred to be the subject for subject and object 317. Likewise of many detected objects, only one object is inferred to be the object for subject and object 317. For example, multiple entities may be serially or concurrently used to infer classifications, and the earliest inference to finish with subject as the class may be used as the subject for subject and object 317. For example, subject and object 317 may be based on classifications C4-C6 of individual words in FIG. 1. Entity role inferencing techniques are discussed later for FIG. 7.

According to column classifications 313, the shown properties of edges 321 and 323 have values for date, amount, and branch that are automatically obtained from respective rows and columns of table 309 during edge generation. According to subject and object 317, the shown properties of vertices 319 and 325 have values that are automatically obtained from portion 307 of prose during vertex generation. A one-to-one correspondence of entities to vertices may be used for vertex generation.

4.0 Example Column Transcription and Column Classification

Figure 4A:
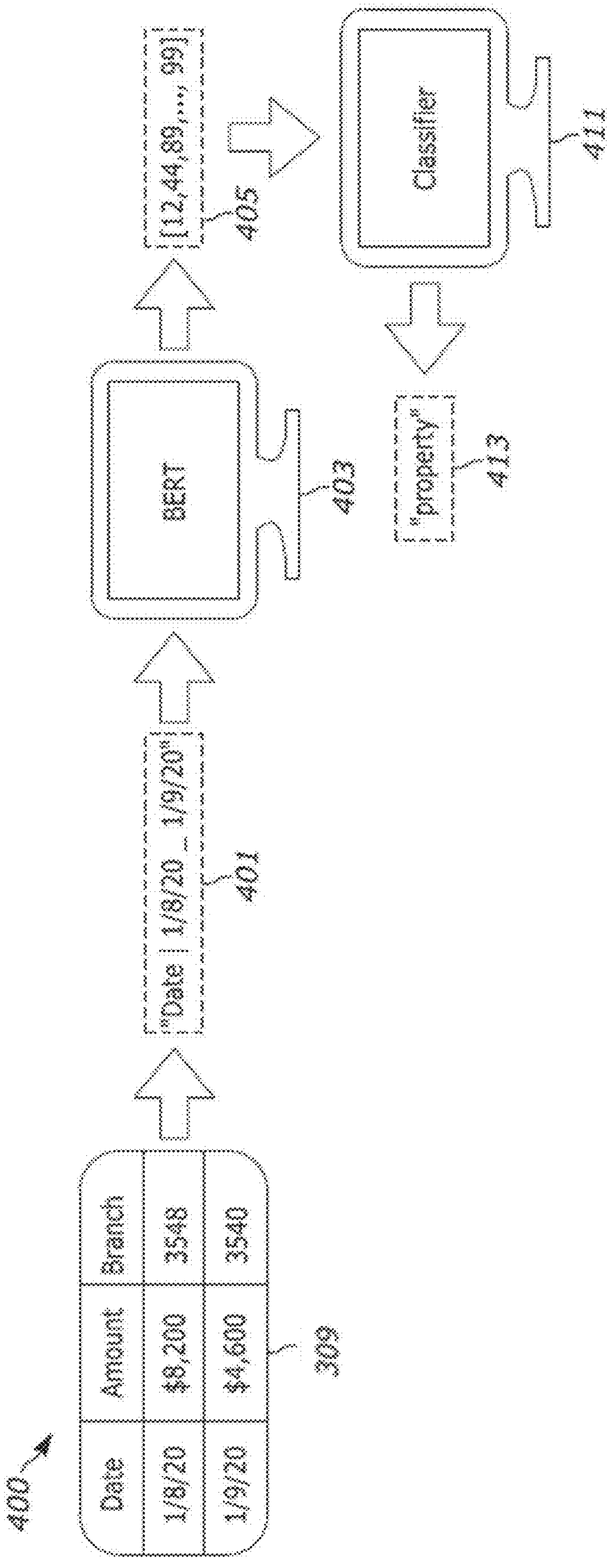
FIG. 4A is a dataflow diagram that depicts example column transcription and column classification.

FIG. 4A is a dataflow diagram that depicts an example natural language processing (NLP) pipeline 400 that has bidirectional encoder representations from transformers (BERT) 403 that is an NLP pipeline stage that linguistically analyzes table 309 of FIG. 3 in text document 301 to infer that the date column in table 309 should be classified as a property as shown or, instead, as a subject or an object, which are linguistic roles (i.e. classes) that facilitate property graph (e.g. final graph 305) generation concerns such as topology, granularity, and flow direction. A property may be used as a vertex property or an edge property or neither.

One or more of computer 100 may implement any or all of the NLP stages of NLP pipeline 400. NLP pipelines 200, 300, and 400 are compatible and their NLP stages may be combined or interleaved in a same NLP pipeline. FIG. 4A is discussed with reference to FIG. 1. BERT 403 contains a full NLP infrastructure stack that can tokenize text into a sequence of words and analyze the sequence including contextual embedding and machine learning (ML) attention.

BERT 403 may or may not be based on roberta neural tiers that operate similar to those of FIG. 2B. BERT and roberta operate as encoders that generate embeddings that are not fixed-size embeddings. Instead the BERT or roberta embeddings of FIGS. 2B and 4A are context-sensitive and can vary in length based on the word count of the input sentence. As discussed below, table 309 contains rows and columns that intersect as cells that store shown values or headers.

As follows, each cell's content is processed as a linguistic word, and cells in one column are concatenated to form a sentence. Herein, each column of table 309 may be transcribed into a respective sentence for NLP analytics. By this columnar transcription, NLP pipeline 400 effectively shreds (i.e. vertically slices or projects) table 309 into columnar sentences that BERT 403 accepts as input such as new text 401. New text 401 contains a columnar sentence generated by columnar transcription.

NLP pipeline 400 uses a novel encoding of the values in the date column to generate new (i.e. synthetic) text 401 that BERT 403 accepts as input. Depending on embodiment, new text 401 is a new text document (i.e. not text document 301), a new sentence, or a new document that contains only one (i.e. new) sentence.

The horizontal arrow between table 309 and new text 401 represents transcription that copies the shown date column from table 309 into new text 401. This transcription effectively projects and rotates the date column a quarter turn counterclockwise into new text 401.

This transcription generates a special text encoding of the date column that performs a concatenation of the column name (from the shown header of table 309) and all of the values (i.e. dates) in the date column. In new text 401, the column name and the values in the column are separated by whitespace (e.g. the shown vertical pipe character and the underscore character) that BERT 403 treats as separator characters between words. The pipe character may operate as a suffix that indicates "Date" is a column header name.

BERT 403 contains pooling as discussed earlier herein that generates fixed-size encoded column 405 that contains a columnar embedding of new text 401. Classifier 411 may be a softmax classifier as discussed earlier herein for stream processing a feed of documents or may be a more computationally intensive classifier (e.g. ML model) for batching. Classifier 411 is a column classifier that infers that the date column should be classified as property 413 as shown or, instead, as a subject or an object, which are linguistic roles (i.e. classes). Column classification 313 is generated from three inferences by classifier 411 for three columns in table 309. Classifier 411 can infer classifications C1-C3 of FIG. 1.

4.1 Example Coreference Resolution

Coreference resolution may concatenate multiple relations into chains, stars, and subgraphs. As discussed later herein, coreference resolution may or may not occur before graph vertex generation to prevent duplicate vertices. As explained earlier for FIG. 2A, coreference resolution 217 performs semantic analysis to detect entity aliases (i.e. alternate names or other words that denote a same entity in different ways). This semantic analysis may detect an antecedent of a pronoun, which may be a highly contextual detection.

Figure 4B:
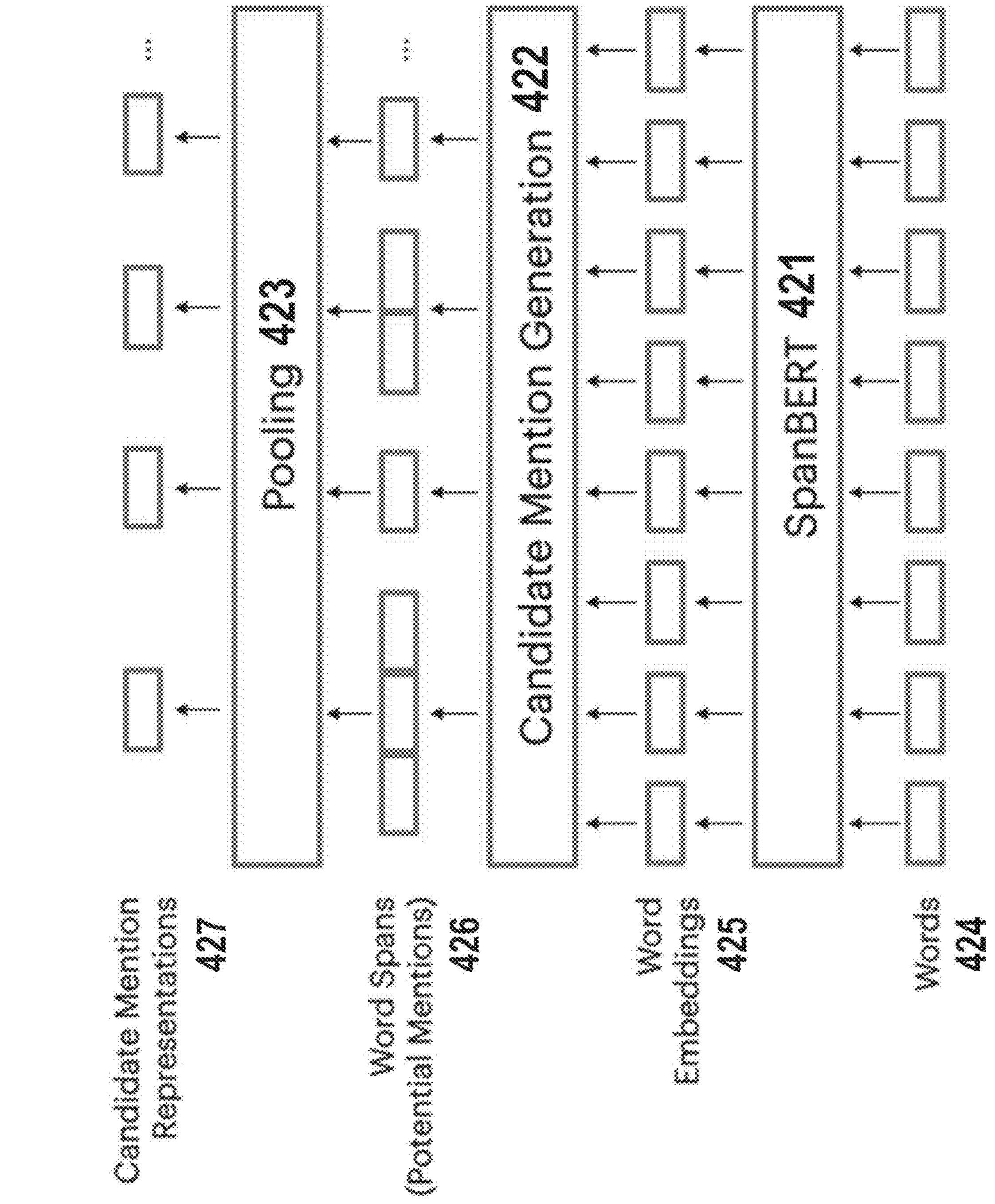
FIG. 4B is a dataflow diagram that depicts an example coreference resolver.

FIG. 4B is a dataflow diagram that depicts an example coreference resolver 420 that may be an implementation of coreference resolution 217. Words 424 may operate similar to words 235 of FIG. 2B. Word embedding 425 may operate similar to word embeddings 238. Spanbert 421 may operate somewhat similar to roberta 251 or BERT 403, except that spanbert 421 does not process individual words. Instead, spanbert 421 processes small spans of a few adjacent words. Spanbert 421 works well for named and unnamed entities that are referred to by pairs or triplets or a few adjacent words such as "Mr. Joe Lunchbox" or "that person".

The initial steps are similar to other BERT or roberta techniques earlier herein, with some important differences. This includes tokenization of the input document into a sequence of words and passing the word sequence through an NLP transformer, in this case spanbert 421, to obtain word embeddings. However, because coreference resolution is concerned with inter-sentence contextual dependencies, the entire text document 301 is processed by spanbert 421. For scalability, text document 301 may be divided into segments of a decided maximum length (e.g. 512 words) and each segment is independently passed through spanbert 421 to obtain corresponding embeddings.

To avoid computational complexity, candidate mention generation 422 generates, and words spans 426 contains, only spans up to a certain length (e.g. 16 words), which is sufficient for any postal address. Each of word spans 426 may contain various counts of words. As discussed earlier herein, pooling 423 generates candidate mention representations 427 that contains a fixed-size encoding of each candidate mention. A mention is an express reference to an entity in a sentence. For example, "Mr. Joe Lunchbox" and "that person" are two mentions of a same or different entities.

Word embeddings 425, word spans 426, and candidate mention representations 427 are a progression of increasingly meaningful numerical representations. Word embeddings 425 and word spans 426 may expressly contain subwords as discussed earlier herein for increased accuracy and density.

4.2 Coreference Resolution Operation

Figure 4C:
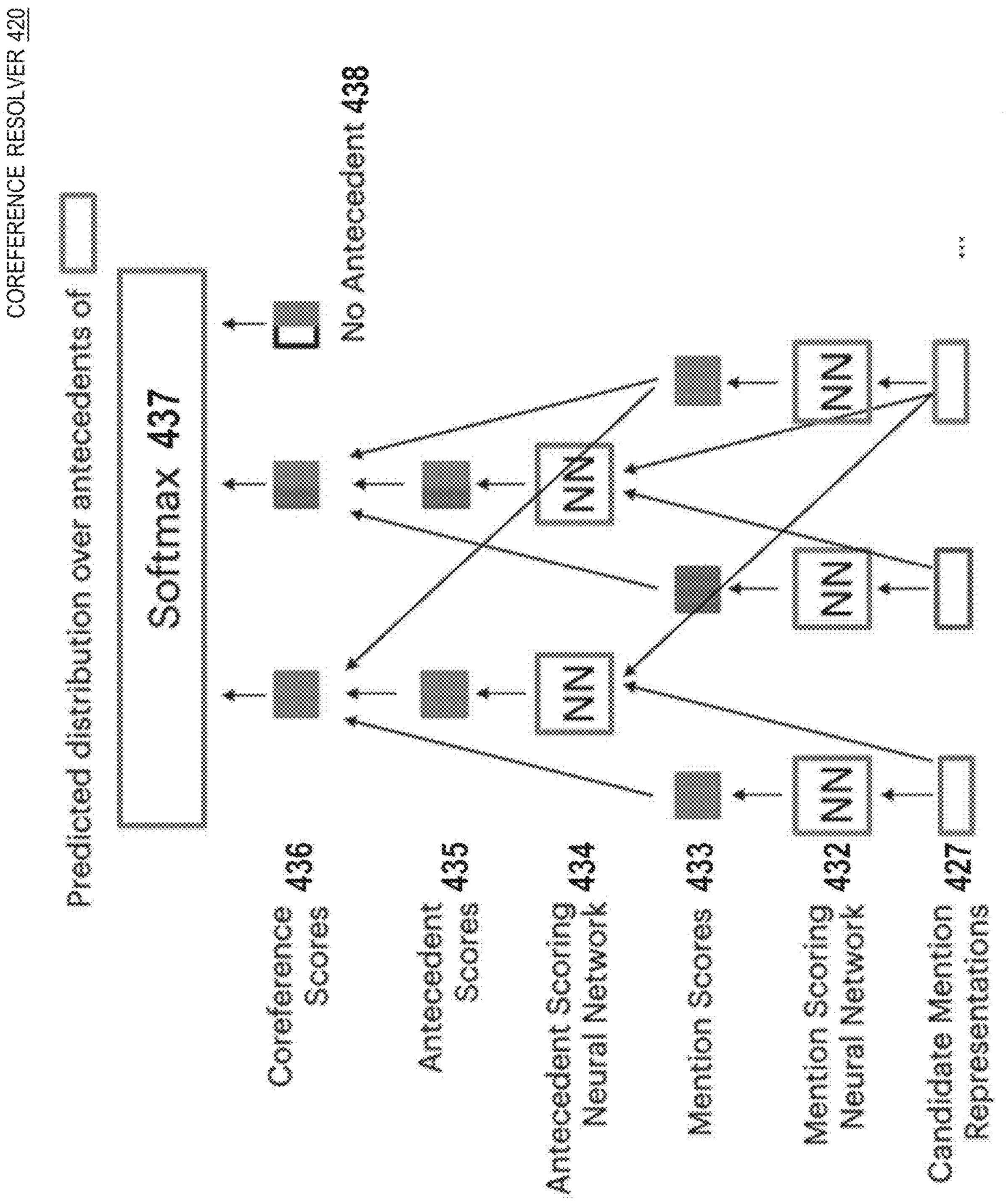
FIG. 4C is a dataflow diagram that depicts coreference resolver operation.

FIG. 4C is a dataflow diagram that depicts example operation of coreference resolver 420 that is already trained according to example neural backpropagation training presented later herein. Inferences are generated by and flow upwards from candidate mention representations 427 through a sequence of specialized neural networks 432, 434, and 437 in coreference resolver 420.

On candidate mention representations 427, coreference resolver 420 performs antecedent finding. In grammar, an antecedent is a named mention that confers its meaning to later mentions using the identical name, a synonymous name, or unnamed such as a pronoun, pro-verb, etc. Only one graph vertex should be generated for an antecedent and all of its coreferences.

Coreference resolution entails detecting which candidate spans are actual mentions, and finding the correct antecedents for each of those mentions. Mention scoring neural network 432 takes as input the span representations of candidate mentions and outputs mention scores 433. Each of mention scores 433 is an inferred probability that a span is a valid mention. Antecedent scoring neural network 434 takes as input a concatenation of two candidates from candidate mention representations 427, and outputs their antecedent scores 435. Each of antecedent scores 435 is an inferred probability that the earlier span is an antecedent of the later span.

To detect whether or not two candidate mentions have a coreference relationship, the sum of the two candidate's individual mention scores and their antecedent score is used, and each sum of those three scores is one of coreference scores 436. Softmax 437 learns the probability distribution of possible antecedents for each mention. A shown additional coreference score is a predefined probability of any mention having no antecedent 438, which may or may not incidentally be the highest coreference score.

During training, the predicted distribution from softmax 437 is compared with the ground truth distribution (not shown) obtained from annotated coreference clusters, where the antecedents of a span are the earlier spans in the same cluster. The loss between these distribution vectors is used for neural fine-tuning, including weights of spanbert 421, and neural networks 432, 434, and 437, and the attention vector in pooling 423.

Candidate mention representations 427 occur in a sequence for text document 301. Coreference resolver 420 predicts an antecedent distribution for a mention in that sequence as follows. In this example, the antecedent distribution prediction is for the candidate mention on the right (i.e. latest). To the left of the latest mention are two earlier mentions. A probability distribution from softmax 437 includes a highest probability for a predicted class (i.e. antecedent), which might be no antecedent 438.

5.0 Example Prose Analytics

As explained earlier for FIG. 3, edge type detection 315 is a single inference that detects the edge type that is shared by edges 321 and 323 that are generated from table 309. In some cases, edge type detection 315 can be inferred solely from column classifications 313. In this example, edge type detection 315 is also based on portion 307 of prose. Edge type detection 315 is an inference that edges 321 and 323 should represent cash transactions.

Figure 5A:
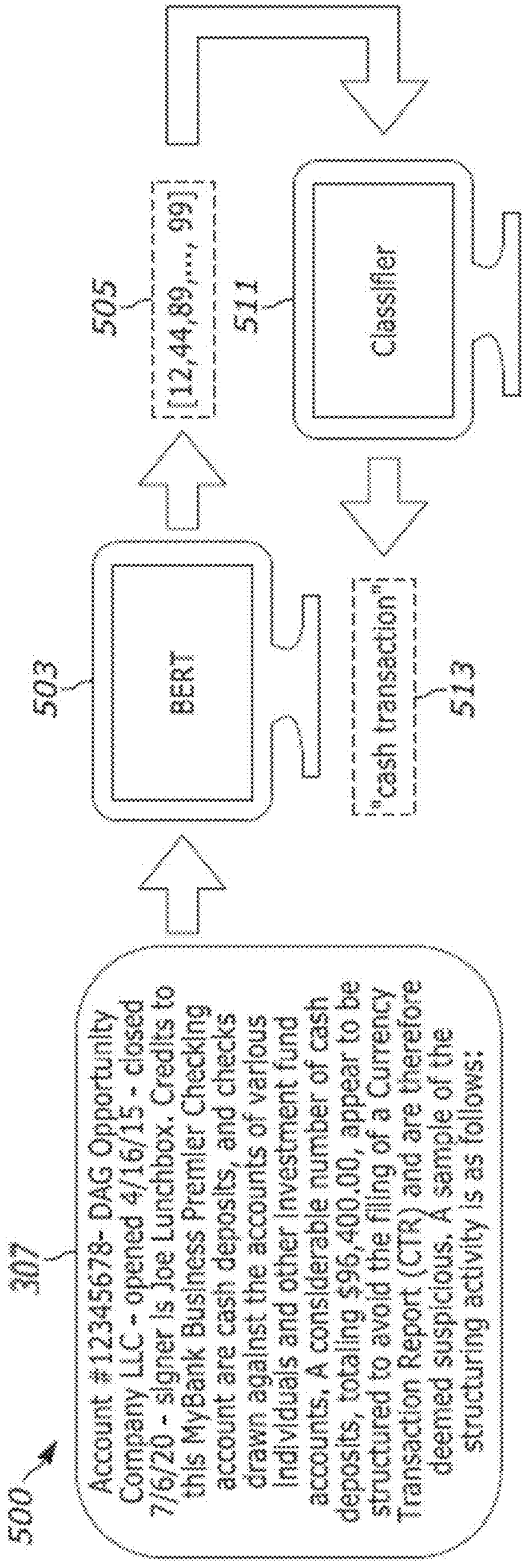
FIG. 5A is a dataflow diagram that depicts linguistic analysis of a portion of prose in a text document to infer edge type detection.

FIG. 5A is a dataflow diagram that depicts an example NLP pipeline 500 that has BERT 503 that is an NLP pipeline stage that linguistically analyzes portion 307 of prose of FIG. 3 in text document 301 to infer edge type detection 315 that indicates that table 309 should be classified as containing cash transactions. That means each row of table 309 contains a separate cash transaction that are respectively represented by edges 321 and 323. Classifier 511 is a table classifier that operates similar to classifier 411 as discussed earlier, and fixed-size encoded column 505 operates similar to fixed-size encoded column 405. Classifier 511 can infer classification C7 of FIG. 1.

5.1 Example Graph Generation Process

Figure 5B:
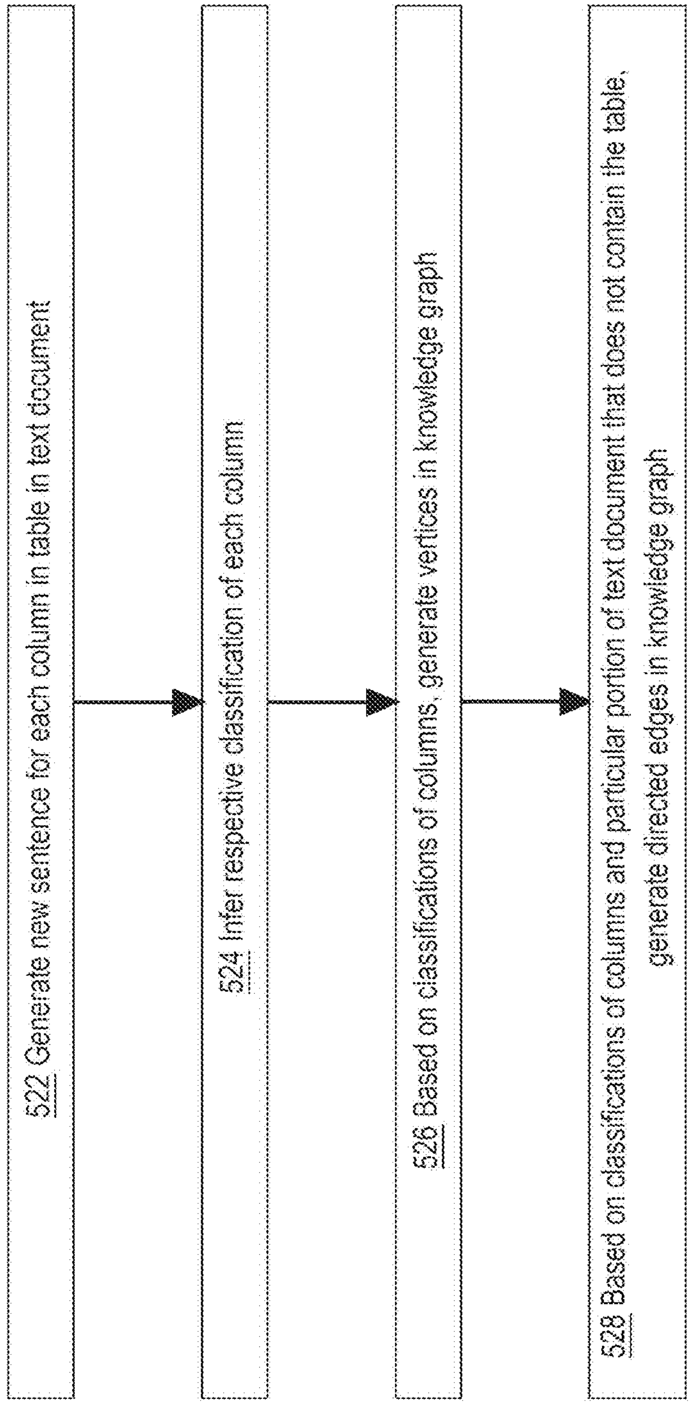
FIG. 5B is a flow diagram that depicts an example computer process to generate a knowledge graph.

FIG. 5B is a flow diagram that depicts an example computer process that any NLP pipeline herein may perform to generate a knowledge graph from a text document that contains natural language prose and data table(s). The process of FIG. 5B may be based on computer 100, and computer 100 may implement any combination of NLP stages and pipelines herein. FIG. 5B provides an example of high performance NLP based on techniques herein.

Although the process of FIG. 5B entails processing one table and one portion of prose in one text document, the process can be repeated in parallel for bulk processing of multiple documents, such as a) parallel processing of multiple tables and portions of prose in a text document in a live stream of text documents or b) parallel processing of multiple text documents or multiple batches of text documents. For example in one text document, multiple tables may each contribute separate sets of generated edges in the knowledge graph being generated.

The single text document that is processed in FIG. 5B may be text document 110, 201, or 301. The single data table that is processed in FIG. 5B may be table 120 or 309. The single portion of prose that is processed in FIG. 5B may be portion 130 or 307 of prose. The single knowledge graph that is generated in FIG. 5B may be graph 221 or 305.

Step 522 generates new sentence for each column in a data table in a text document. For example as discussed earlier for FIG. 4A, each table cell's content may be processed by step 522 as a linguistic word, and cells in one column are concatenated by step 522 to form a sentence. For example, each column of table 309 may be transcribed by step 522 into a respective sentence for NLP analytics. By this columnar transcription, NLP pipeline 400 effectively shreds (i.e. vertically slices or projects) table 309 into columnar sentences that BERT 403 accepts as input such as new text 401. New text 401 contains a columnar sentence generated by columnar transcription in step 522.

Based on each sentence generated by step 522, step 524 infers a respective classification of each column in the table. Step 524 infers one classification per sentence. As discussed earlier herein for FIG. 4A, steps 522 and 524 may operate in ML pipeline 500, including BERT 403 that contains pooling that step 524 uses to generate fixed-size encoded column 405 that contains a columnar embedding of new text 401 (i.e. a sentence generated by step 522). Classifier 411 may be a softmax classifier as for stream processing of a live feed of documents or may be a more computationally intensive classifier (e.g. ML model) for batching.

For example, step 522 and 524 may process the three columns in table 309 of FIG. 3, including the shown date column. Classifier 411 is a column classifier that infers that the date column should be classified by step 524 as property 413 as shown or, instead, as a subject or an object, which are linguistic roles (i.e. classes). During step 524, column classification 313 is generated from three inferences by classifier 411 for three columns in table 309.

Based on classifications of columns by step 524, step 526 generates vertices in the knowledge graph being generated. Depending on the embodiment, vertices are generated before or after coreference resolution. That is, final vertices may be generated from merged entities, or duplicate vertices may be generated and merged. Whether merging entails entities or vertices, the merging is based on coreference resolution.

As discussed earlier for FIG. 4C, candidate mention representations 427 appear as unresolved entities in a sequence for text document 301. Coreference resolver 420 predicts an antecedent distribution for a mention in that sequence as follows. A probability distribution from softmax 437 includes a highest probability for a predicted class (i.e. antecedent), which might be no antecedent 438. Based on coreference resolution, step 526 may merge entities before generating vertices or may merge vertices.

Edge generation may occur before or after coreference resolution and, in either case, does not entail generation and merging of duplicate edges. Based on classifications of columns by step 524 and based on portion 307 of prose that does not contain table 309, step 528 generates directed edges in the knowledge graph being generated.

Step 528 linguistically analyzes portion 307 of prose of FIG. 3 in text document 301 to infer edge type detection 315 that indicates that table 309 should be classified as containing cash transactions. That means each row of table 309 contains a separate cash transaction that are respectively represented by edges 321 and 323. As discussed earlier for FIG. 5A, step 528 may operate ML pipeline 500, including operation of BERT 503 and classifier 511 as discussed earlier.

In that way, steps 526 and 528 generate vertices and edges to generate the knowledge graph, which may be graph 221 or 305.

6.0 Example Property Graph

Figure 6:
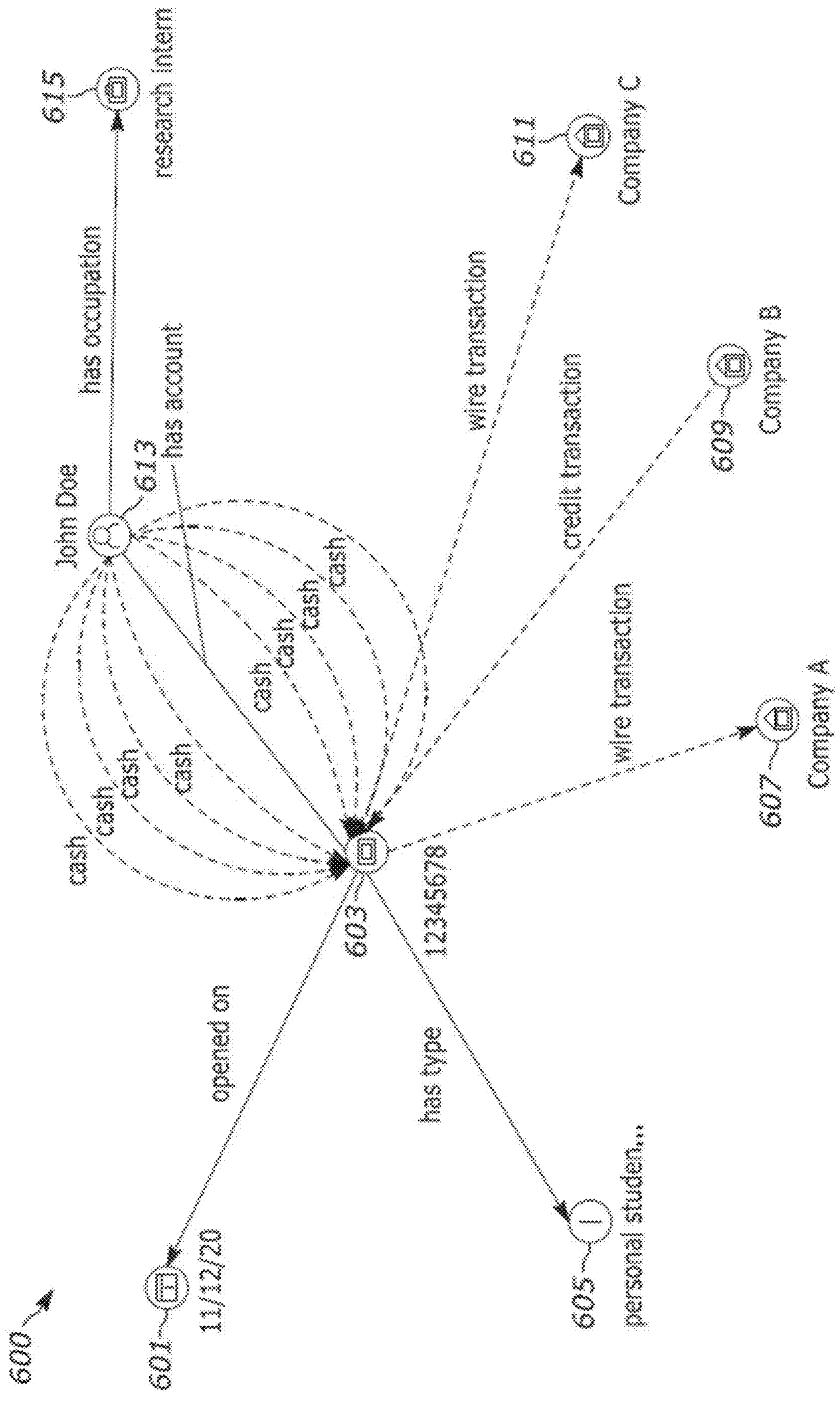
FIG. 6 depicts an example generated property graph.

FIG. 6 depicts an example property graph 600 that contains vertices 601, 603, 605, 607, 609, 611, 613, and 615 that represent distinct entities. For example, vertex 603 represents shown account 12345678. Vertex 603 is topologically significant according to a count of connected edges or a count of neighbors (i.e. connected vertices). Property graph 600 is generated and operated similar to final graph 305. For example, the many cash transaction relations connected to vertex 603 may correspond to rows in a table in a document as discussed earlier herein, but that does not mean that rows in a table are limited to redundant edges between only two vertices. Rows of a table may instead be used to generate edges for a star that has one vertex as its center and the edges connect out to various other vertices. Property graph 600 may be generated and operated as a knowledge graph.

7.0 Example Linguistic Role Classification

As explained earlier herein, a relation may connect two entities and be represented as an edge that connects two vertices. Herein, edges are directed, which means that both entities of a relation have respective linguistic roles such as subject and object. Subject and object 317 are an inferred subject and an inferred object, which are two separate linguistic inferences that are role classifications. Document elements 307 and 309 may contain many entities that table2graph 303 may infer respective roles for. Of those many entities, several may be classified as a subject, but only one of those subjects is inferred to be the subject for subject and object 317 as discussed earlier herein. Likewise of many detected objects, only one object is inferred to be the object for subject and object 317. Entity role inferencing from prose occurs as follows.

Figure 7:
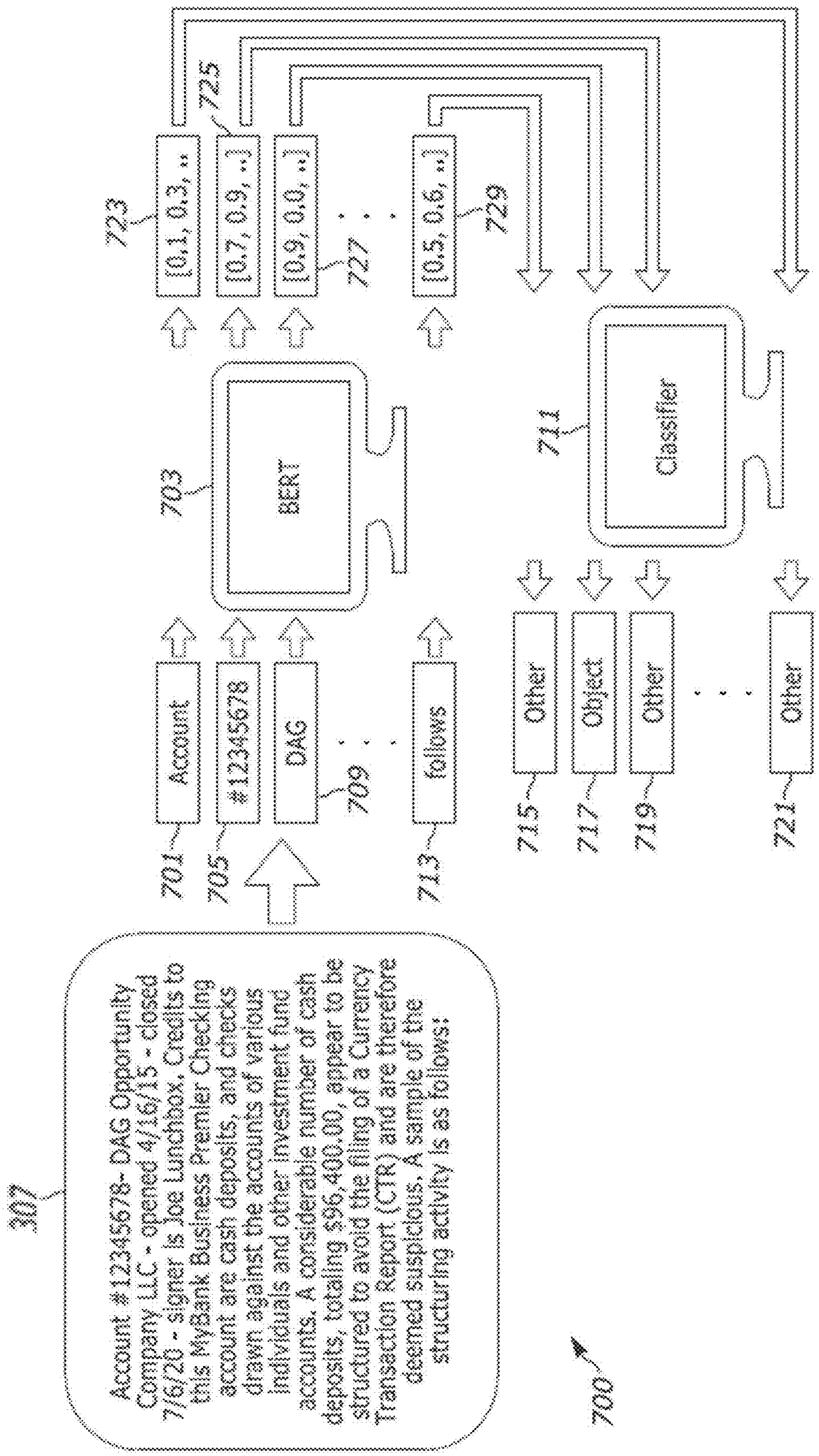
FIG. 7 is a dataflow diagram that depicts linguistic role classification.

FIG. 7 is a dataflow diagram that depicts an example NLP pipeline 700 that has BERT 703 that is an NLP pipeline stage that linguistically analyzes portion 307 of prose of FIG. 3 in text document 301 to infer subject and object 317. Although the architectures of NLP pipelines 500 and 700 are similar and both process portion 307 of prose, operation of NLP pipeline 700 differs as follows.

Portion 307 of prose is tokenized into a sequence of words, including words 701, 705, 709, and 713. This sequence of words operates similar to words 235 as discussed for FIG. 2B. For each input word, BERT 703 infers a fixed-sized word encoding in a sequence of encodings that includes word encodings 723, 725, 727, and 729. Classifier 711 operates similar to other classifiers earlier herein. Classifier 711 infers a class such as subject, object, or other for each word encoding to generate classifications 715, 717, 719, and 721. For example, classifier 711 may infer classifications C4-C6 of FIG. 1. As explained earlier herein, subject and object occur as a pair of entities in a relation and are consistent with the direction of the edge that represents the relation. In an embodiment, classifier 711 does not directly predict a class for each word, and classifier 711 instead predicts a class for a sequence of a few adjacent words and indicates where one class instance ends and another starts, especially if two instances of a same class are adjacent.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
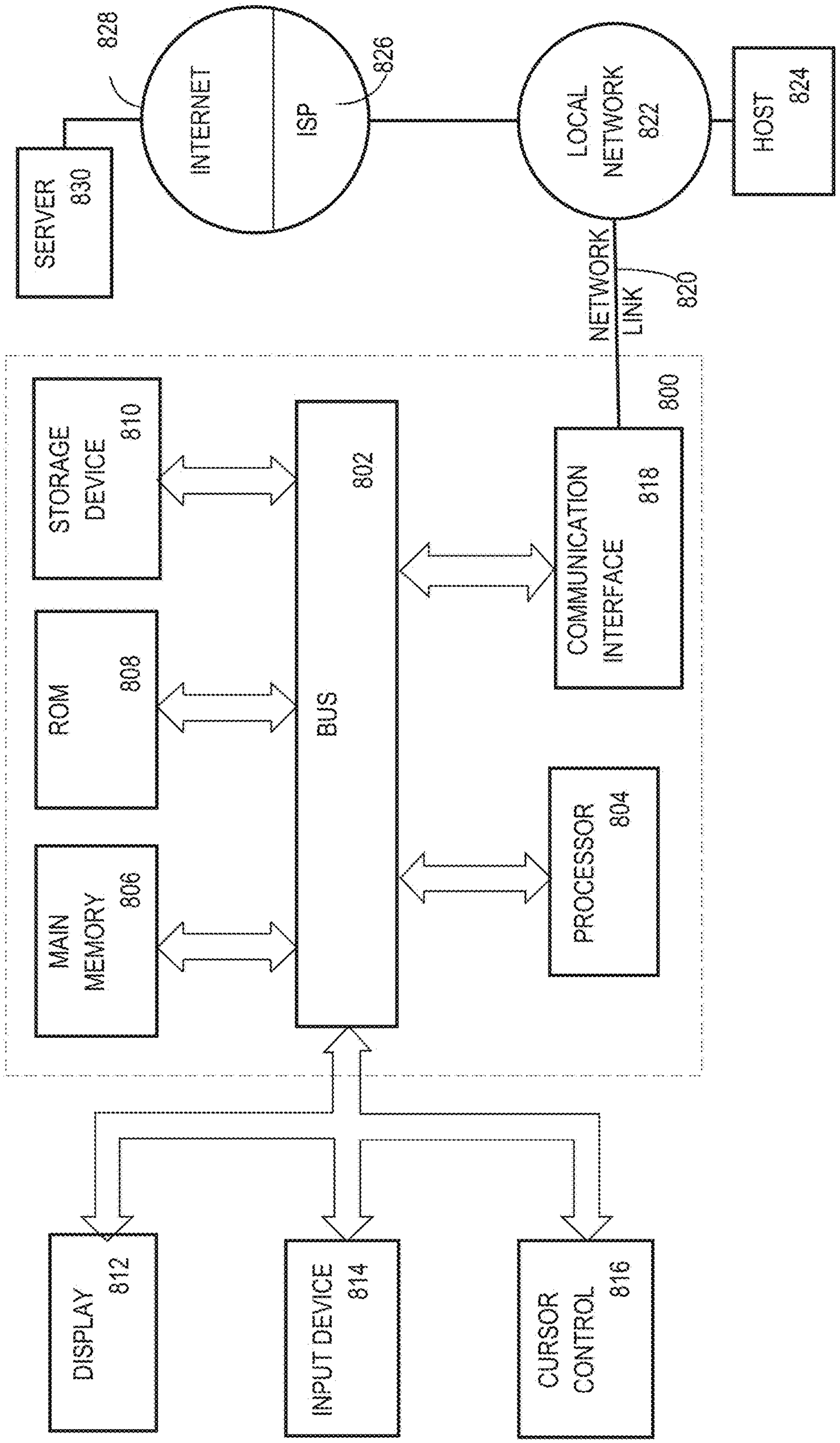
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
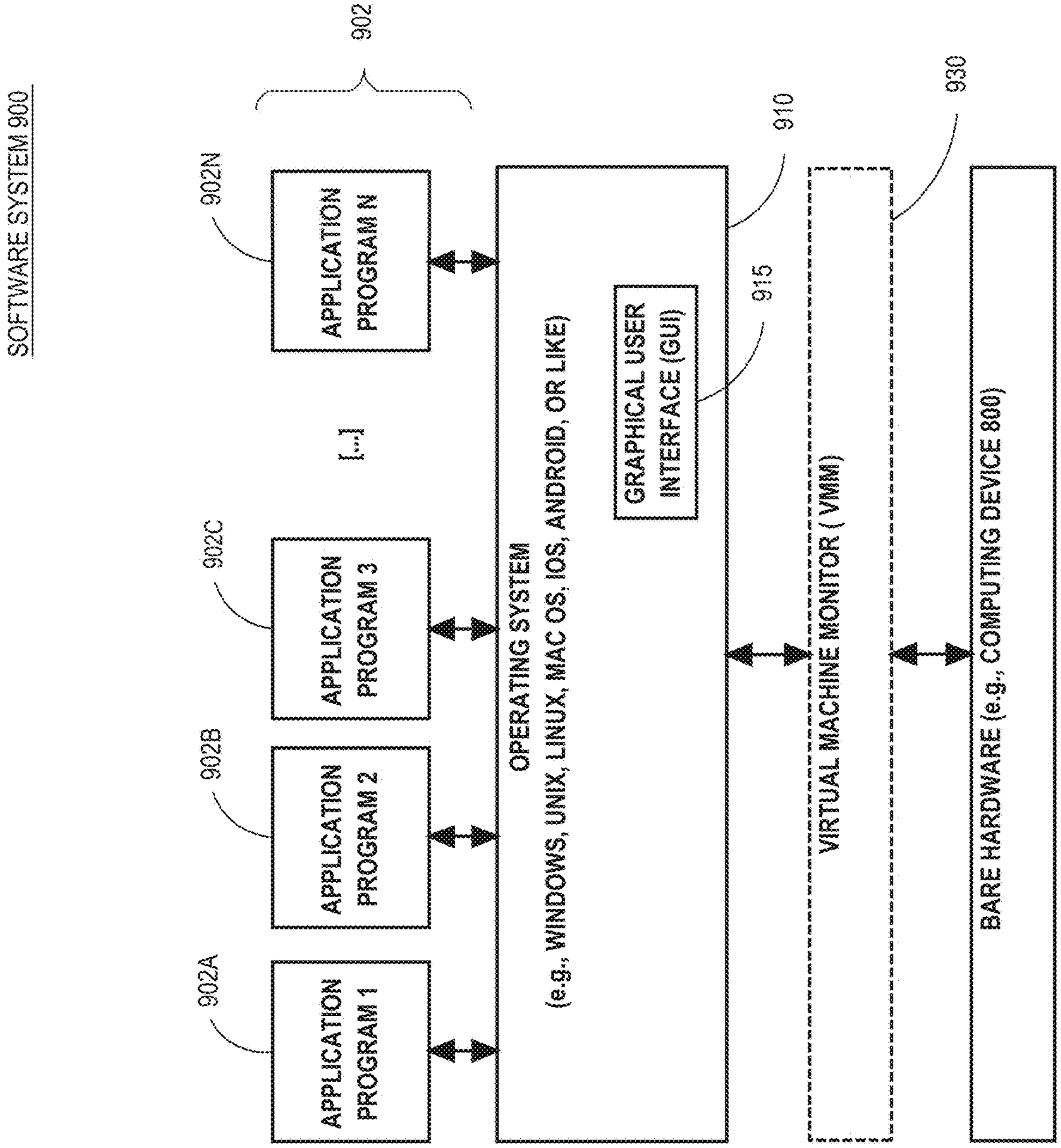
FIG. 9 is a block diagram that illustrates a basic software system that may be employed for controlling the operation of a computing system.

FIG. 9 is a block diagram of a basic software system 900 that may be employed for controlling the operation of computing system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2 (1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

inferring a respective classification of each column of a plurality of columns in a table in a particular document, including for a particular column of the plurality of columns:

inferring a respective classification of each word in a plurality of words in a particular portion of the particular document that does not contain the table, wherein the classification of a particular word in the plurality of words finishes earliest and is a particular classification, and using, as the classification of the particular column, the particular classification;

generating, based on the classifications of the plurality of columns in the table in the particular document, a plurality of vertices; and generating, based on the classifications of the plurality of columns in the table in the particular document and the particular portion of the particular document that does not contain the table, a plurality of edges;

wherein the method is performed one or more computers.

2. The method of claim 1 wherein said generating the plurality of edges comprises:

inferring, from the particular portion of the particular document that does not contain the table, a classification of the particular portion of the particular document, and determining, based on the classification of the particular portion of the particular document, an edge type for the plurality of edges.

3. The method of claim 1 wherein said inferring the classifications of the plurality of columns in the table in the particular document comprises generating a new sentence for each column of the plurality of columns.

4. The method of claim 3 wherein said generating the new sentence for a particular column of the plurality of columns in the table in the particular document comprises concatenating values stored in the particular column.

5. The method of claim 1 wherein:

the plurality of words in the particular portion of the particular document contains duplicates of a particular word;

the method further comprises generating, for each duplicate of the particular word, a distinct respective contextual embedding.

6. The method of claim 1 wherein said inferring the classifications of the plurality of words in the particular portion of the particular document that does not contain the table is performed by a neural network containing at most two neural layers.

7. The method of claim 1 wherein said inferring the classifications of the plurality of words in the particular portion of the particular document comprises:

generating a respective word fragment embedding for each fragment of a plurality of fragments of a particular word of the plurality of words, averaging the word fragment embeddings of the plurality of fragments of the particular word, and generating an embedding of the particular word based on said averaging the word fragment embeddings of the plurality of fragments of the particular word.

8. The method of claim 1 wherein said inferring the classifications of the plurality of words in the particular portion of the particular document is based on a sequential ordering of the plurality of words.

9. The method of claim 1 further comprising generating a graph that represents the particular document, wherein the graph contains the plurality of edges, the plurality of vertices, and other vertices that represent values in the particular document that are not in the particular portion of the particular document nor in the table in the particular document.

10. One or more machine-readable non-transitory media storing instructions that, when executed by one or more processors, cause:

inferring a respective classification of each column of a plurality of columns in a table in a particular document, including for a particular column of the plurality of columns:

inferring a respective classification of each word in a plurality of words in a particular portion of the particular document that does not contain the table, wherein the classification of a particular word in the plurality of words finishes earliest and is a particular classification, and using, as the classification of the particular column, the particular classification;

generating, based on the classifications of the plurality of columns in the table in the particular document, a plurality of vertices; and generating, based on the classifications of the plurality of columns in the table in the particular document and the particular portion of the particular document, a plurality of edges.

11. The one or more machine-readable non-transitory media of claim 10 wherein said generating the plurality of edges comprises:

inferring, from the particular portion of the particular document that does not contain the table, a classification of the particular portion of the particular document, and determining, based on the classification of the particular portion of the particular document, an edge type for the plurality of edges.

12. The one or more machine-readable non-transitory media of claim 10 wherein said inferring the classifications of the plurality of columns in the table in the particular document comprises generating a new sentence for each column of the plurality of columns.

13. The one or more machine-readable non-transitory media of claim 12 wherein said generating the new sentence for a particular column of the plurality of columns in the table in the particular document comprises concatenating values stored in the particular column.

14. The one or more machine-readable non-transitory media of claim 10 wherein:

the plurality of words in the particular portion of the particular document contains duplicates of a particular word;

the instructions further cause generating, for each duplicate of the particular word, a distinct respective contextual embedding.

15. The one or more machine-readable non-transitory media of claim 10 wherein said inferring the classifications of the plurality of words in the particular portion of the particular document that does not contain the table is performed by a neural network containing at most two neural layers.

16. The one or more machine-readable non-transitory media of claim 10 wherein the instructions further cause generating a graph that represents the particular document, wherein the graph contains the plurality of edges, the plurality of vertices, and other vertices that represent values in the particular document that are not in the particular portion of the particular document nor in the table in the particular document.

* * * * *